(12) United States Patent
Jebb et al.

(10) Patent No.: US 7,766,743 B2
(45) Date of Patent: Aug. 3, 2010

(54) METHODS AND APPARATUS FOR EVALUATING A USER'S AFFINITY FOR A PROPERTY

(76) Inventors: Douglas Schoellkopf Jebb, 160 E. 89th St. #7D, New York, NY (US) 10128; James Everett Byrne, 105 W. 55th St., Apt. 7A, New York, NY (US) 10019

(*) Notice: Subject to any disclaimer, the term of this patent is extended or adjusted under 35 U.S.C. 154(b) by 0 days.

(21) Appl. No.: 10/231,870

(22) Filed: Aug. 29, 2002

(65) Prior Publication Data

US 2004/0043372 A1 Mar. 4, 2004

(51) Int. Cl.
*A63F 13/02* (2006.01)
*A63F 13/10* (2006.01)
*A63F 9/18* (2006.01)
*G09B 5/00* (2006.01)
*G09B 3/00* (2006.01)
*G09B 7/00* (2006.01)
*G06Q 30/00* (2006.01)
*G06Q 50/00* (2006.01)
*A63F 13/12* (2006.01)
*G07G 1/14* (2006.01)

(52) U.S. Cl. ............... 463/25; 463/23; 463/29; 434/307 R; 434/322; 705/14.1; 705/14.2; 705/14.31; 705/14.32

(58) Field of Classification Search .......... 434/236, 434/219, 322, 307 R, 307 A, 323–364; 463/23, 463/25–29, 9, 40–42; 705/14.1, 14.2, 14.31, 705/14.32, 14
See application file for complete search history.

(56) References Cited

U.S. PATENT DOCUMENTS

| | | | | | |
|---|---|---|---|---|---|
| 4,876,592 | A | * | 10/1989 | Von Kohorn | 725/23 |
| 5,195,033 | A | * | 3/1993 | Samph et al. | 434/323 |
| 5,259,766 | A | * | 11/1993 | Sack et al. | 434/362 |
| 5,370,399 | A | * | 12/1994 | Liverance | 463/23 |
| 5,508,731 | A | * | 4/1996 | Kohorn | 725/24 |

(Continued)

FOREIGN PATENT DOCUMENTS

WO    WO 02/080080 A1 * 10/2002

OTHER PUBLICATIONS

Derwent abstract for KR 2004-066622 A.*

(Continued)

*Primary Examiner*—Peter DungBa Vo
*Assistant Examiner*—Matthew D. Hoel
(74) *Attorney, Agent, or Firm*—Buckley, Maschoff & Talwalkar LLC

(57) ABSTRACT

A system, method, apparatus, means, and computer program code for facilitating or allowing a user's affinity for a property to be evaluated, recognized, rewarded and/or monetized. A user may access a Web site, computer system, kiosk, or other resource operated by, for or on behalf of a property. For example, a server may implement a Web site on behalf of one or more properties. The user may then provide or authorize a payment that allows the user to receive or take a test directed to examining the user's knowledge of a property and/or to receive information regarding one or more actions that the user may complete to demonstrate the user's affinity for the property. A user demonstrating affinity for the property may receive recognition or other benefit associated with the property.

12 Claims, 17 Drawing Sheets

U.S. PATENT DOCUMENTS

| | | | |
|---|---|---|---|
| 5,697,844 A * | 12/1997 | Von Kohorn | 463/40 |
| 5,759,101 A * | 6/1998 | Von Kohorn | 463/40 |
| 5,816,918 A * | 10/1998 | Kelly et al. | 463/16 |
| 5,907,831 A * | 5/1999 | Lotvin et al. | 705/14 |
| 5,915,973 A * | 6/1999 | Hoehn-Saric et al. | 434/350 |
| 5,947,747 A * | 9/1999 | Walker et al. | 434/354 |
| 6,007,426 A * | 12/1999 | Kelly et al. | 463/16 |
| 6,015,344 A * | 1/2000 | Kelly et al. | 463/16 |
| 6,018,718 A * | 1/2000 | Walker et al. | 705/14 |
| 6,055,573 A * | 4/2000 | Gardenswartz et al. | 709/224 |
| 6,099,320 A * | 8/2000 | Papadopoulos | 434/322 |
| 6,128,599 A * | 10/2000 | Walker et al. | 705/14 |
| 6,144,948 A * | 11/2000 | Walker et al. | 705/38 |
| 6,157,808 A * | 12/2000 | Hollingsworth | 434/350 |
| 6,212,358 B1 * | 4/2001 | Ho et al. | 434/362 |
| 6,301,462 B1 * | 10/2001 | Freeman et al. | 434/350 |
| 6,325,631 B1 * | 12/2001 | Kouba et al. | 434/219 |
| 6,431,875 B1 * | 8/2002 | Elliott et al. | 434/322 |
| 6,434,534 B1 * | 8/2002 | Walker et al. | 705/14 |
| 6,443,840 B2 * | 9/2002 | Von Kohorn | 463/17 |
| 6,449,598 B1 * | 9/2002 | Green et al. | 705/2 |
| 6,514,079 B1 * | 2/2003 | McMenimen et al. | 434/219 |
| 6,524,109 B1 * | 2/2003 | Lacy et al. | 434/219 |
| 6,544,042 B2 * | 4/2003 | Lippman | 434/322 |
| 6,546,230 B1 * | 4/2003 | Allison | 434/350 |
| 6,616,453 B2 * | 9/2003 | Kouba et al. | 434/219 |
| 6,629,843 B1 * | 10/2003 | Bunting et al. | 434/118 |
| 6,633,742 B1 * | 10/2003 | Turner et al. | 434/350 |
| 6,679,703 B2 * | 1/2004 | Alling | 434/219 |
| 6,767,212 B2 * | 7/2004 | Thomas | 434/236 |
| 6,800,031 B2 * | 10/2004 | Di Cesare | 463/40 |
| 6,985,879 B2 * | 1/2006 | Walker et al. | 705/35 |
| 7,257,367 B2 * | 8/2007 | Etuk et al. | 434/350 |
| 2001/0023059 A1 * | 9/2001 | Toki | 434/157 |
| 2001/0025252 A1 * | 9/2001 | Yoshimoto | 705/14 |
| 2001/0031456 A1 * | 10/2001 | Cynaumon et al. | 434/350 |
| 2001/0032094 A1 * | 10/2001 | Ghosh et al. | 705/1 |
| 2001/0032125 A1 * | 10/2001 | Bhan et al. | 705/14 |
| 2002/0046087 A1 * | 4/2002 | Hey | 705/14 |
| 2002/0046095 A1 * | 4/2002 | Wallace | 705/14 |
| 2002/0049634 A1 * | 4/2002 | Longinotti | 705/14 |
| 2002/0052860 A1 * | 5/2002 | Geshwind | 706/62 |
| 2002/0119430 A1 * | 8/2002 | Szynalski | 434/219 |
| 2002/0127528 A1 * | 9/2002 | Potter | 434/322 |
| 2002/0133386 A1 * | 9/2002 | Chishti et al. | 705/8 |
| 2002/0146674 A1 * | 10/2002 | Betz et al. | 434/350 |
| 2002/0188509 A1 * | 12/2002 | Ariff et al. | 705/14 |
| 2002/0192629 A1 * | 12/2002 | Shafrir | 434/322 |
| 2003/0017442 A1 * | 1/2003 | Tudor et al. | 434/322 |
| 2003/0044760 A1 * | 3/2003 | Banerjee et al. | 434/350 |
| 2003/0077559 A1 * | 4/2003 | Braunberger et al. | 434/322 |
| 2003/0082508 A1 * | 5/2003 | Barney | 434/308 |
| 2003/0135826 A1 * | 7/2003 | Dozier | 715/515 |
| 2004/0033475 A1 * | 2/2004 | Mizuma et al. | 434/219 |
| 2004/0132000 A1 * | 7/2004 | Dowdell et al. | 434/350 |

OTHER PUBLICATIONS

International Search Report for PCT/US03/26807.*
Brown, Janelle "Three lives in Everquest", Jun. 15, 1999, Salon.com, 2pgs.
Asher, Mark "First Look at New EverQuest Expansion—More Crack for EverQuest Addicts on the Way in Ruins of Kunark; Product Development", Apr. 1, 2000, Section: p. 34; ISSN: 0744-6667, IAC-ACC-No. 59554133. Computer Gaming World. Asher, Mark "EverQuest: The Ruins of Kunark—A Timely Upgrade to the Most Popular Online RPG; Software Review; Evaluation", Jun. 1, 2000, Section: p. 66; ISSN: 0744-6667, IAC-ACC-No. 61861556. Computer Gaming World.
"Siview Multimedia, A Real Airful", article from Sports Illustrated. p. 26.
Advertisement, Unforgettable moments from the Academy Awards ceremonies, Mar. 24$^{th}$. 1pg.
"PCT Notification of Transmittal of the Internal Search Report or the Declaration", dated Jan. 14, 2004 for PCT/US03/26807, 5pgs.
Fun & Games, 74$^{th}$ Annual Academy Awards, Mar. 24, 2002; 5PM PST [online], Oscar.com, [retrieved on Mar. 23, 2002]. Retrieved from the internet: <URL:http://www.oscar.com/fungames/fungames_home.html>. 2pgs.
How Smart are you?, [online], Jun. 14, 2002, Emode.Com. Retrieved from the internet:<URL: http://www.emode.com/>. 2pgs.
EverQuest FAQ: You're in Our World Now, [online]. Station.com, EverQuest Live. [retrieved on Apr. 22, 2002]. Retrieved from the internet: <URL:http://everquest.station.sony.com/eqlive/faq.jsp>. 38pgs.
Lord of the Rings Fanatics Plaza—Fan Gatherings, [online], [retrieved on Apr. 22, 2002]. Lord of the Rings Fanatics Network ©2001-2002. Retrieved from the internet: <URL:http://www.lotrplaza.com/>. 26pgs.
Lord of the Rings Fanatics Forum, [online], [retrieved on Apr. 22, 2002]. Lord of the Rings Fanatics Network ©2001-2002. Retrieved from the internet: <URL:http://www.lotrplaza.com/forum/default.asp>. 2pgs.
Lord of the Rings Fanatics Plaza: Halls of Knowledge, [online], [retrieved on Apr. 22, 2002]. Lord of the Rings Fanatics Network ©2001-2002. Retrieved from the internet:<URL:http://www.lotrplaza.com/forum/knowledge.asp >. 2pgs.
Lord of the Rings Fanatics Plaza: Rankings & Priviliges [online], [retrieved on Apr. 22, 2002]. Lord of the Rings Fanatics Network ©2001-2002. Retrieved from the internet: <URL:http://www.lotrplaza.com/forum/ranks.asp >. 8pgs.
Lord of the Rings Fanatics Plaza: FAQ [online], [retrieved on Apr. 22, 2002]. Lord of the Rings Fanatics Network ©2001-2002. Retrieved from the internet: <URL: http://www.lotrplaza.com/forum/faq.asp >. 12pgs.
Learn more about IgoUgo [online], IgoUgo Best of. [retrieved on Apr. 22, 2002]. Retrieved from the internet: <URL: http://www.igougo.com/register/guide_howtol.html >. 1pg.
Welcome to IgoUgo [online], IgoUgo is a community of real people sharing their travel experiences . . . [retrieved on Apr. 22, 2002]. Retrieved from the internet: <URL: http://www.igougo.com/home.html >. 1pg.
About IgoUgo: FAQ [online], IgoUgo Best of. [retrieved on Apr. 22, 2002]. Retrieved from the internet: <URL: http://www.igougo.com/about/about_faq.html >. 8pgs.
IgoUgo Rewards [online], [retrieved on Apr. 22, 2002]. Retrieved from the internet: <URL: http://www.igougo.com/rewards/pointsinfo.html >. 4pgs.
The Official Site of the Masters Tournament [online], The Masters Golf Tournament: Official Site by IBM, Apr. 8-14, 2002. Copyright © Augusta National, Inc. and IBM Corporation. All rights reserved. Retrieved from the Internet. 2pgs.
The Official Site of the Masters Tournament—ePatron [online], The Masters Golf Tournament: Official Site by IBM, Apr. 8-14, 2002. [retrieved on Apr. 12, 2002]. Copyright © Augusta National, Inc. and IBM Corporation. All rights reserved. Retrieved from the Internet. 1pg.
The Official Site of the Masters Tournament—Daily Quizzes [online], The Masters Golf Tournament: Official Site by IBM, Apr. 8-14, 2002. Copyright © Augusta National, Inc. and IBM Corporation. All rights reserved. Retrieved from the Internet. 2pgs.
The Official Site of the Masters Tournament—Daily Quizzes/Results [online], The Masters Golf Tournament: Official Site by IBM, Apr. 8-14, 2002. Copyright © Augusta National, Inc. and IBM Corporation. All rights reserved. Retrieved from the Internet. 1pg.

* cited by examiner

| TEST INFORMATION ||||||
|---|---|---|---|---|---|
| TEST IDENTIFIER 402 | QUESTION IDENTIFIERS 404 | ANSWERS GIVEN TO QUESTIONS 406 | USER IDENTIFIER 408 | TEST DATES 410 | TEST SCORES 412 |
| T-1781 | Q-301-1<br>Q-301-2<br>Q-301-3<br>Q-301-5<br>Q-301-8<br>Q-301-10<br>Q-301-14<br>Q-301-21<br>Q-301-29<br>Q-301-36 | Q-301-1-C<br>Q-301-2-C<br>Q-301-3-C<br>Q-301-5-C<br>Q-301-8-C<br>Q-301-10-C<br>Q-301-14-C<br>Q-301-21-C<br>Q-301-29-C<br>Q-301-36-C | U-382694 | 5/7/02 | 10/10 |
| T-4231 | Q-301-2<br>Q-301-4<br>Q-301-7<br>Q-301-12<br>Q-301-18<br>Q-301-23<br>Q-301-25<br>Q-301-29<br>Q-301-33<br>Q-301-36 | Q-301-2-I (JOE DAKOTA)<br>Q-301-4-I (TOM KNOLL)<br>Q-301-7-C<br>Q-301-12-I (1972)<br>Q-301-18-C<br>Q-301-23-C<br>Q-301-25-C<br>Q-301-29-C<br>Q-301-33-I (35)<br>Q-301-36-C | U-428023 | 5/10/02 | 6/10 |

| USER INFORMATION ||||||| |
|---|---|---|---|---|---|---|
| | | | | | | 450 |
| USER IDENTIFIER 452 | USER NAME 454 | USER ADDRESS 456 | USER AGE 458 | TEST DATES 460 | TEST RESULTS 462 | CERT. NUMBER 464 |
| U-230910 | BILL JOHNSON | 1212 MAIN STREET NEW CANAAN CONNECTICUT 55555 | 20 | 4/1/02 4/7/02 4/24/02 | FAIL FAIL PASS | 1451071 |
| U-275181 | ANNE SMITH | 351 DEERFIELD ROAD DETROIT MICHIGAN 66666 | 35 | 4/18/02 | PASS | 1450920 |
| U-382694 | DOUG BYRNE | 14 MEDIA LANE APARTMENT 52 NEW YORK, NEW YORK 77777 | 32 | 5/7/02 | PASS | 1451137 |
| U-428023 | ROBERT JONES | 89 ROSEWOOD AVENUE GLENDALE CALIFORNIA 88888 | 42 | 5/10/02 | FAIL | N/A |
| U-587769 | CHARLES WILSON | 1455 SPRING STREET BOULDER COLORADO 99999 | 25 | 6/15/02 6/24/02 | FAIL PASS | 1454268 |

FIG. 15

| QUESTION INFORMATION 500 | | | |
|---|---|---|---|
| QUESTION IDENTIFIER 502 | QUESTION 504 | INCORRECT ANSWERS 506 | CORRECT ANSWER 508 |
| Q-301-1 | WHICH WOLVERINES QUARTERBACK HAS THE MOST TOTAL PASSING YARDS? | VINNIE MORTON, JOE DAKOTA, CRAIG BLEDSOE | TERRY BRADEN |
| Q-301-2 | WHO HAS THE LONGERST KICK-OFF RETURN FOR A TOUCH-DOWN IN WOLVERINES HISTORY? | TERRANCE DICKERSON, PHIL DORSET, RICKY TAYLOR | DERRIK ROMNEY |
| Q-301-3 | WHEN DID THE WOLVERINES JOIN THE AMERICAN FOOTBALL LEAGUE? | 1956, 1957, 1958 | 1959 |
| Q-301-4 | WHO WAS THE FIRST HEAD COACH OF THE WOLVERINES | ARA LOMBARDI, TOM KNOLL, CHUCK LANDRY | PETER WINTER |
| Q-301-5 | WHAT IS THE MOST POINTS EVER SCORED BY THE WOLVERINES IN A SINGLE GAME? | 65, 70, 72 | 58 |
| Q-301-6 | WHAT CURRENT WOLVERINES PLAYER HAS PLAYED THE MOST GAMES AS A WOLVERINE? | RICKY TAYLOR, FERGUS HAM, REGGIE LAKEWOOD | BILL HAMMER |
| Q-301-7 | FROM WHAT COLLEGE DID WIDE RECEIVER CHIS STOLLINGS GRADUATE? | UCLA, OHIO STATE UNIVERSITY, GEORGIA TECH | PENN STATE UNIVERSITY |
| Q-301-8 | WHO WAS THE LAST WOLVERINES PLAYER TO WIN THE AFL MOST VALUABLE PLAYER AWARD? | VINNIE MORTON, DREW MILLER, JOE DAKOTA | JOSHUA PINKERTON |
| Q-301-9 | WHO HAS THE MOST WINS AS A WOLVERINES HEAD COACH? | ARA LOMBARDI, TOM KNOLL, PETER WINTER | CHUCK LANDRY |
| Q-301-10 | WHO IS THE CURRENT SPECIAL TEAMS COACH FOR THE WOLVERINES? | RALPH JACKSON, ERIC REYNOLDS, FRANK BUCKLEN | SAM PECK |

FIG. 16

| QUESTION INFORMATION 500 ||||||
|---|---|---|---|---|---|
| QUESTION IDENTIFIER 502 | QUESTION DIFFICULTY RATING 524 | NUMBER OF TIMES USED 526 | NUMBER OF TIMES CORRECT ANSWER GIVEN 528 | NUMBER OF TIMES QUESTION USED BY GENDER 530 | NUMBER OF TIMES CORRECT ANSWER GIVEN BY GENDER 532 |
| Q-301-1 | HARD | 55 | 30 | M-40 F-15 | M-25 F-5 |
| Q-301-2 | HARD | 36 | 15 | M-25 F-11 | M-8 F-7 |
| Q-301-3 | EASY | 40 | 30 | M-30 F-10 | M-22 F-8 |
| Q-301-4 | EASY | 50 | 38 | M-30 F-20 | M-20 F-18 |
| Q-301-5 | MEDIUM | 40 | 28 | M-20 F-20 | M-12 F-16 |
| Q-301-6 | MEDIUM | 30 | 17 | M-20 F-10 | M-10 F-7 |
| Q-301-7 | HARD | 59 | 31 | M-15 F-44 | M-7 F-24 |
| Q-301-8 | EASY | 60 | 43 | M-20 F-40 | M-15 F-28 |
| Q-301-9 | MEDIUM | 40 | 25 | M-20 F-20 | M-15 F-10 |
| Q-301-10 | MEDIUM | 50 | 30 | M-20 F-30 | M-12 F-18 |

FIG. 17

METHODS AND APPARATUS FOR EVALUATING A USER'S AFFINITY FOR A PROPERTY

FIELD OF THE INVENTION

The present invention relates to a method and apparatus for determining or evaluating a user's affinity for a property and providing a benefit to the user based on the user's level of affinity.

BACKGROUND OF THE INVENTION

Developing loyal customer and fan relationships is becoming increasingly important to companies and individuals. For example, a movie star or producer, sports team or organization, book publisher, or celebrity may want to develop a web site as a way of distributing information to fans and of generating and maintaining fan interest.

The growth and availability of the Internet, cable and satellite television, international programming, mobile devices (e.g., cellular telephones, personal digital assistants) and media outlets have given users many sources or avenues of information regarding celebrities, teams, movies, books, sports stars, etc. (referred to herein as properties) of interest. With so many distribution points for information regarding properties, the link between the properties and the users has become blurred. For example, a user can be a die-hard supporter of the Detroit Red Wings hockey team without ever visiting Detroit, attending a hockey game, purchasing a ticket or team affiliated t-shirt, etc. By merely watching games on television, listening to the games on the radio, and reading coverage of the team on-line or in newspapers, the invisible fan is created.

Unfortunately, the property owners or managers have difficulty in recognizing users and evaluating and rewarding the users' interest, knowledge, and devotion. In addition, property owners or managers do not have a way to separate or distinguish the more loyal, knowledgeable, or devoted users from other less interested or committed users. Nor do they have the ability to recognize and reward the more loyal users based on the users' superior knowledge and affinity. Moreover, from the user's standpoint, the user is not able to demonstrate the user's level of affinity for the property in a clear and objective forum that is recognized by the property. And upon demonstrating a high affinity level for a property, users have no vehicle to separate themselves among the less devoted users who exhibit lower levels of affinity.

It would be advantageous to provide method and apparatus that overcame the drawbacks of the prior art. In particular, it would be desirable to provide methods, apparatus, means and computer code for recognizing or otherwise determining or evaluating a user's affinity for a property (e.g., sports team, television show, singer, book) and for providing a benefit to the user accordingly.

SUMMARY OF THE INVENTION

Embodiments of the present invention provide a system, method, apparatus, means, and computer program code for facilitating or allowing a user's affinity and knowledge of a property to be tested, evaluated, recognized, rewarded and/or monetized. In some embodiments, a property may be any type of organization or individual such as, for example, an athlete (e.g., Lance Armstrong, Jeff Gordon, Willie Mays), sports team or sports related organization (e.g., NCAA, NFL, NASCAR, Los Angeles Dodgers, New York Yankees, Utah Jazz), television show, movie or movie related organization, book, author, musical group or entertainer, etc. In other embodiments, a property may represent an inanimate object (e.g., book, steam powered locomotives, Barbie™ dolls), location or geographic area (e.g., Gettysburg battlefield, Washington D.C., Edinburgh Castle) or other subject matter (e.g., dogs, U.S. Civil War) which may associated with a certifying entity.

According to some embodiments of the present invention, a user may access a Web site, computer system, telephone bank or call center, kiosk, or other resource operated by, for or on behalf of a property. For example, a server may implement a Web site on behalf of one or more properties. The user may then provide or authorize a payment that allows the user to receive or take a test directed to examining the user's affinity for the property. For example, in some embodiments a user's affinity for a property may be determined by testing the user's knowledge of the property. The test may be customized for the user or based on one or more attributes of the user. If the user passes the test, the user may receive a customized reward, benefit or other recognition. In addition, the user may be offered an opportunity to purchase or obtain goods that reflect or indicate that the user passed the test and/or the user's level of affinity for the property. As another example, in some embodiments, the user's affinity for a property may be determined by evaluating activities or tasks undertaken by the user. For example, a user's affinity for a hockey team may be evaluated based on the number of games the user has attended, whether or not the user is a partial or full season ticket holder or on a waiting list to obtain season tickets, the number of promotional events sponsored by or involving the team that the user has attended or agrees to attend, etc.

In some embodiments, for users who pass a test, complete one or more designated actions (also referred to herein as tasks), and/or otherwise earn a certification designation, recognition of the user's achievement may be provided, published or made publicly available via a book, document, Web site, list, record or other material, some of which may be in digital or other electronic form. A user may be provided or offered the opportunity to include a photograph of the user, quote, autograph (which may be in electronic form), certification identifier, etc. in the book, document, Web site, list, or other material.

As illustrated by these examples, the present invention provides an affinity acknowledgement system and method. These and other features will be discussed in further detail below, by describing a system, individual devices, and processes according to embodiments of the invention.

Additional objects, advantages, and novel features of the invention shall be set forth in part in the description that follows, and in part will become apparent to those skilled in the art upon examination of the following or may be learned by the practice of the invention.

According to some embodiments of the present invention, a method for determining a user's affinity for a property may include identifying a user who wants to take a test regarding the user's knowledge of a property; receiving a payment associated with the user and the test; establishing the test; allowing the user to take the test; and providing a certification designation if the user passes the test. In some further embodiments, a method for determining a user's affinity for a property may include identifying a user who wants to take a test regarding the user's knowledge of a property; establishing the test; allowing the user to take the test; and providing an indication that the user has earned a certification designation associated with the property. In some additional embodiments, a method for determining a user's affinity for a property may include receiving a request for a test for a user who wants to take a test regarding the user's knowledge of a property in order to demonstrate affinity for the property; determining a test applicable to the user; providing the test in response to the request; receiving an indication of a result of the user taking the test; and providing a certification designation if the user passes the test. In some other embodiments, a method for determining a user's affinity for a property may include receiving a request for a test for a user who wants to take a test regarding the user's affinity for a property; determining a test applicable to the user; providing the test in response to the request; receiving an indication of a result of the user taking the test and/or determining results of the user taking the test; and providing an indication that the user has earned a certification designation associated with the property. In some still further embodiments, a method for determining a user's affinity for a property may include identifying a user who wants to demonstrate affinity for a property; determining at least one action that the user may complete to demonstrate affinity for the property; determining that the user has completed the at least one action; and providing a certification designation regarding the user and the property and/or providing an indication that the user has earned a certification designation associated with the property.

According to some embodiments of the present invention, a system for determining a user's affinity for a property may include a memory; a communication port; and a processor connected to said memory and said communication port, said processor being operative to identify a user who wants to take a test regarding the user's knowledge of a property; receive a payment associated with the user and the test; establish the test; allow the user to take the test; and provide a certification designation if the user passes the test and/or provide an indication that the user has earned a certification designation associated with the property. In some additional embodiments, a system for determining a user's affinity for a property may include a memory; a communication port; and a processor connected to said memory and said communication port, said processor being operative to receive a request for a test for a user who wants to take a test regarding the user's knowledge of a property in order to demonstrate affinity for the property; determine a test applicable to the user; provide the test in response to the request; receive an indication of a result of the user taking the test; and provide a certification designation if the user passes the test. In some other embodiments, a system for determining a user's affinity for a property may include a memory; a communication port; and a processor connected to said memory and said communication port, said processor being operative to receive a request for a test for a user who wants to take a test regarding the user's affinity for a property; determine a test applicable to the user; providing the test in response to the request; receive an indication of a result of the user taking the test and/or determine results of the user taking the test; and provide an indication that the user has earned a certification designation associated with the property. In some still further embodiments, system for determining a user's affinity for a property may include a memory; a communication port; and a processor connected to said memory and said communication port, said processor being operative to identify a user who wants to demonstrate affinity for a property; determine at least one action that the user may complete to demonstrate affinity for the property; determine that the user has completed the at least one action; and provide a certification designation regarding the user and the property and/or provide an indication that the user has earned a certification designation associated with the property.

According to some embodiments of the present invention, a computer program product in a computer readable medium for determining a user's affinity for a property may include first instructions for identifying a user who wants to take a test regarding the user's knowledge of a property; second instructions for obtaining a payment associated with the user and the test; third instructions for creating the test; fourth instructions for enabling the user to take the test; and fifth instructions for sending a certification designation if the user passes the test and/or an indication that the user has earned a certification designation associated with the test. In some additional embodiments, a computer program in a computer readable medium for determining a user's affinity for a property may include first instructions for obtaining a request for a test for a user who wants to take a test regarding the user's knowledge of a property in order to demonstrate affinity for the property; second instructions for identifying a test applicable to the user; third instructions for sending the test in response to the request; fourth instructions for obtaining an indication of a result of the user taking the test; and fifth instructions for sending a certification designation if the user passes the test. In some other embodiments, a computer program in a computer readable medium for determining a user's affinity for a property may include first instructions for obtaining a request for a test for a user who wants to take a test regarding the user's affinity for a property; second instructions for creating a test applicable to the user; third instructions for sending the test in response to the request; fifth instructions for sending an indication of a result of the user taking the test and/or for identifying results of the user taking the test; and sixth instructions for sending an indication that the user has earned a certification designation associated with the property. In some still further embodiments, a computer program in a computer readable medium for determining a user's affinity for a property may include first instructions for identifying a user who wants to demonstrate affinity for a property; second instructions for identifying at least one action that the user may complete to demonstrate affinity for the property; third instructions for identifying that the user has completed the at least one action; and fourth instructions for sending a certification designation regarding the user and the property and/or for sending an indication that the user has earned a certification designation associated with the property.

According to some embodiments of the present invention, an apparatus for determining a user's affinity for a property may include means for identifying a user who wants to take a test regarding the user's knowledge of a property; means for obtaining a payment associated with the user and the test; means for creating the test; means instructions for enabling the user to take the test; and means instructions for sending a certification designation if the user passes the test and/or an indication that the user has earned a certification designation associated with the test. In some additional embodiments, an apparatus for determining a user's affinity for a property may include means for obtaining a request for a test for a user who wants to take a test regarding the user's knowledge of a property in order to demonstrate affinity for the property; means for identifying a test applicable to the user; means for sending the test in response to the request; means for obtaining an indication of a result of the user taking the test; and means for sending a certification designation if the user passes the test. In some other embodiments, an apparatus for determining a user's affinity for a property may include means for obtaining a request for a test for a user who wants to take a test regarding the user's affinity for a property; means for creating a test applicable to the user; means for sending the test in response to the request; means for sending an indication of a result of the user taking the test and/or for identifying results of the user taking the test; and means for sending an indication that the user has earned a certification designation associated with the property. In some still further embodiments, an apparatus for determining a user's affinity for a property may include means for identifying a user who wants to demonstrate affinity for a property; means for identifying at least one action that the user may complete to demonstrate affinity for the property; means for identifying that the user has completed the at least one action; and means for sending a certification designation regarding the user and the property and/or for sending an indication that the user has earned a certification designation associated with the property.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

FIG. 14 is an illustration of a representative test information database of FIG. 13;

FIG. 15 is an illustration of a representative user information database of FIG. 13;

FIG. 16 is an illustration of a representative question information database of FIG. 13; and FIG. 17 is another illustration of a representative question information database of FIG. 13.

DETAILED DESCRIPTION

Figure 1:
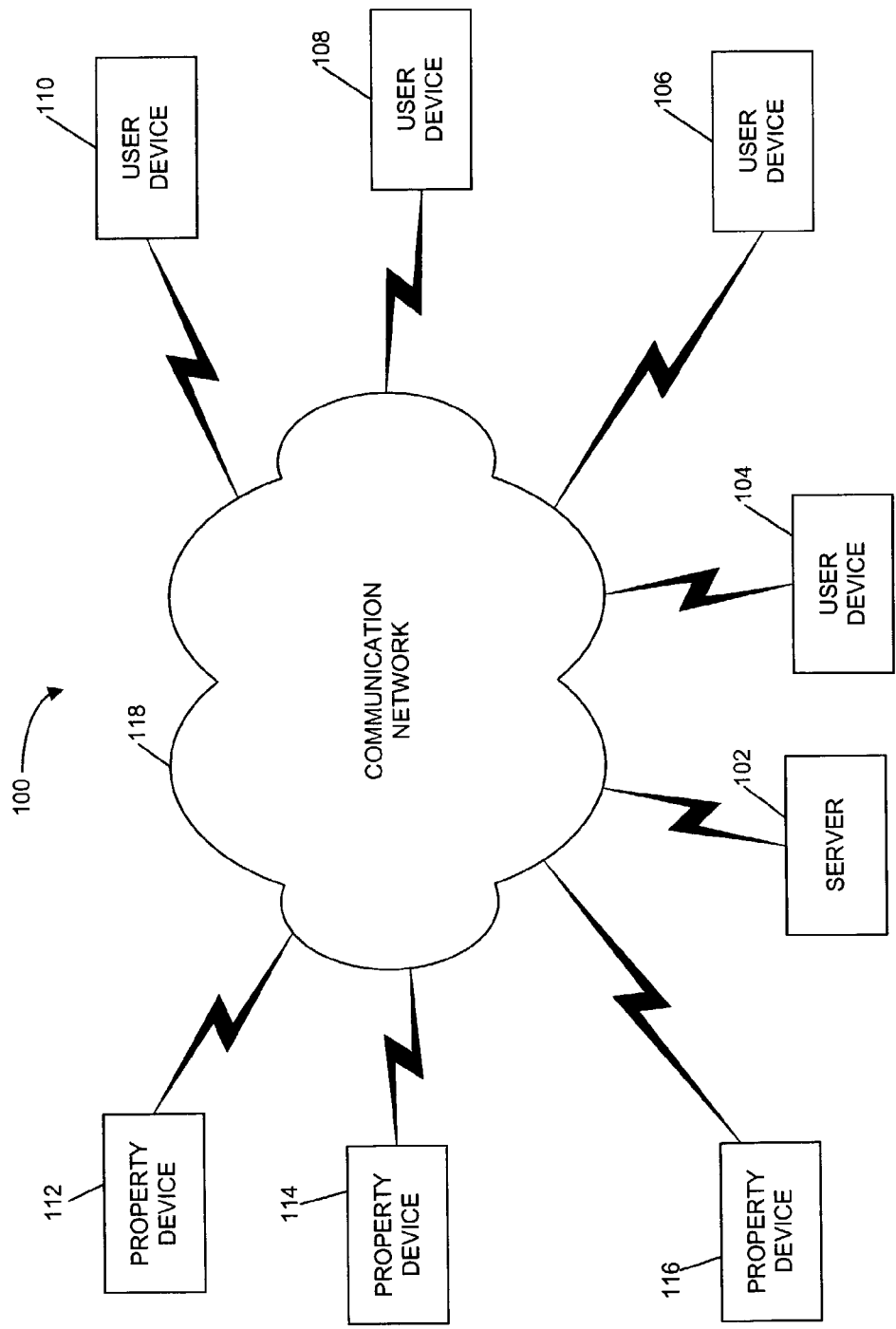
FIG. 1 is a block diagram of system components for an embodiment of an apparatus usable with the methods of the present invention.

Applicants have recognized that there is a market opportunity for systems, means and methods that allow a user's affinity of a property to be evaluated, recognized, rewarded and/or monetized. A property may be any type of organization or individual such as, for example, a sports team or organization, a television show, movie or movie related organization, musical group or entertainer, etc. For example, an actor may be considered as a property about which a user may have knowledge. As another example, the New York Yankees baseball team may be a property.

Applicants have recognized that there is a combination of knowledge, loyalty and devotion that can define or form the basis of a connection between a user and a property the user accesses or uses (e.g., a baseball fan and the Boston Red Sox, a Civil war buff and the Gettysburg battlefields, Harley Davidson™ motorcycle owners and the brand). The owners or managers of the properties can build on this connection towards developing a long term relationship with the users.

In some embodiments a property may include or have a subject and an associated certifying entity. For example, an actor may have an official or associated club that operates as the certifying entity and the actor is the subject. The New York Yankees organization may operate as the certifying entity for the New York Yankees baseball team. As another example, a property may comprise a subject "dogs" and have an associated certifying entity such as a dog lovers group, kennel association, etc. As another example, a property may use a specific book or series of books as the subject while the publisher or author of the books, or a reading group associated with the books, may operate a club or organization associated with the book that also serves as the certifying entity or be the certifying entity itself.

As a more specific example, in some embodiments a book publisher may want to develop and evaluate reader's affinity in a book or a series of books. A reader's affinity for a book may be reflected by the reader's knowledge of the book, the book's characters and plot, etc. Alternatively, or in addition, the reader's affinity for the book may be reflected by the number of times the reader visits a Web site devoted to the book or its characters, the number of times the reader attends events regarding the book or its characters, etc. The book publisher may direct the reader to complete one or more actions (e.g., attend a book signing by the author of the book) to demonstrate the reader's affinity for the book or otherwise inform the reader of actions that the reader may complete or conduct to demonstrate affinity.

As will be discussed in more detail below, in some embodiments a user may access a Web site, telephone bank or call center, computer system, kiosk, or other resource operated by, for or on behalf of a property. For example, a server may implement a Web site on behalf of one or more properties. The user may then provide or authorize a payment that allows the user to receive or take a test directed to examining the user's knowledge of a property or affinity for the property or to receive a certification designation once the user has taken and/or passed a test or has conducted some other action that entitles the user to receive the certification designation. A test may be in a variety of formats (e.g., multiple-choice, true/false). Depending on the results of the test, the user may be certified by the property or a related organization (e.g., a certifying entity associated with the property or forming part of the property) at a particular certification designation or level. As an alternative to, or in addition to, testing a user's knowledge of a property, in some embodiments the server may determine the user's affinity for a property by determining the user's relationship with the property and/or by directing the user to complete one or more actions that are indicative of the user's affinity for the property. For example, a user may have or express an affinity for a sports team by attending the team's games, purchasing season tickets for the team, listen to or watching the team's games, attending events that are sponsored by the team or that include members from the team, etc. If the user has or agrees to complete one or more actions related to the property, the property or the related organization may award a certification designation to the user.

In addition to obtaining a certification designation, the user may receive an electronic copy or version (e.g., a PDF file) of a certificate that reflects the user's passing of the test and/or the user's completion of one or more actions that demonstrates the user's affinity for a property. In some embodiments, the certification designation or level may depend or be based on the property, the payment made or authorized by the user, the user's results on the test, the user' action(s), and/or some other criteria. For example, a higher score on the test may result in the user receiving a higher certification designation level than would have been available if the user scored lower on the test. The certification designation may be valid for a limited or finite period of time (e.g., one year, length of a baseball season). Once the user has received a certification designation associated with a specific property, the user may be allowed to purchase or otherwise order and obtain additional goods, tangible objects, and materials (e.g., license plates, banners, coffee mugs, apparel, books, bumper stickers) that indicate the user's status as "certified fan" of the property or other certification designation awarded to the user. The certification designation may include an indication of the certifying entity associated with the property. In addition, the user's name, an identifier associated with the user, a certification designation earned by or awarded to the user, or some other indicator may be provided or listed in a book, on a Web site, or in some other publication or location that may include the names, photos, favorite quotes, identifiers, etc. of one or more other users who have passed a test or completed one or more affinity demonstrating activities, earned a certification designation, etc. In this manner, the user may become permanently associated with the property or become part of the history of the property. These and other features will be discussed in further detail below, by describing a system, individual devices, and processes according to embodiments of the invention.

System

Now referring to FIG. 1, an apparatus or system 100 usable with the methods disclosed herein is illustrated. The apparatus 100 includes a server 102 that may communicate directly or indirectly with one or more user devices 104, 106, 108, 110 and/or one or more property devices 112, 114, 116 via a computer, data or other communications network 118 The devices shown in FIG. 1 need not be in constant communication. For example, a user device may communicate with the server 102 only when such communication is appropriate or necessary.

In some embodiments, a server 102 may implement or host a Web site. A server 102 can comprise a single device or computer, a networked set or group of devices or computers, a workstation, etc. In some embodiments, a server 102 also may function as a database server. The use, configuration and operation of servers will be discussed in more detail below.

The user or client devices 104, 106, 108, 110 preferably allow entities to interact with the server 102 and the remainder of the apparatus 100. The user devices 104, 106, 108, 110 also may enable a user to access Web sites, software, databases, etc. hosted or operated by the server 102. If desired, the user devices 104, 106, 108, 110 also may be connected to or otherwise in communication with other devices. Possible user devices include a personal computer, portable computer, mobile or fixed user station, workstation, network terminal or server, cellular telephone, kiosk, dumb terminal, personal digital assistant, etc. In some embodiments, information regarding one or more users and/or one or more user devices may be stored in, or accessed from, a user information database and/or a user device information database.

The property devices 112, 114, 116 may be used by, for or on behalf of one or more property owners. For example, a professional sports team may operate a Web site on a device that provides information regarding the team and/or that implements one or more of the methods disclosed herein. As another example, a publicity agent for a movie actor may operate a Web site that provides information regarding the actor and/or that implements one or more of the methods disclosed herein. Alternatively, a certifying entity may operate or use a property device for providing information regarding one or more subjects to interested users, receiving queries from the interested users regarding the subject(s), etc.

In some embodiments, a property device may work in conjunction with a server 102 to implement one or more of the methods disclosed herein. The server 102 also may implement one or more of the methods disclosed herein for or on behalf of multiple properties. In some embodiments, a property device can comprise a single device or computer, a networked set or group of devices or computers, a workstation, etc. Alternatively, in some embodiments, a property device may be configured or implemented as a kiosk, terminal or workstation. Such a property device may be at a location associated temporarily or permanently with a property (e.g., football stadium, a concert arena, movie theater, bookstore, shopping mall).

Many different types of implementations or hardware/software configurations can be used in the system 100 and with the methods disclosed herein and the methods disclosed herein are not limited to any specific hardware/software configuration for the system 100 or any of its components. For example, in some embodiments a server may be in communication directly or indirectly with one or more user devices and also in communication directly or indirectly with one or more property devices such that user devices and property devices do not communicate directly with each other.

The communications network 118 might be or include the Internet, the World Wide Web, or some other public or private computer, cable, telephone, television, client/server, peer-to-peer, or communications network or intranet, as will be described in further detail below. The communications network 118 illustrated in FIG. 1 is meant only to be generally representative of one or more cable, computer, telephone, television, peer-to-peer or other communication networks for purposes of elaboration and explanation of the present invention and other devices, networks, etc. may be connected to the communications network 118 without departing from the scope of the present invention. The communications network 118 may include one or more networks. The communications network 118 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 102 and/or a property device without departing from the scope of the present invention. For example, a user device may be connected directly to the server 102 and/or to a property device. Moreover, as used herein, communications include those enabled by wired or wireless technology.

Figure 2:
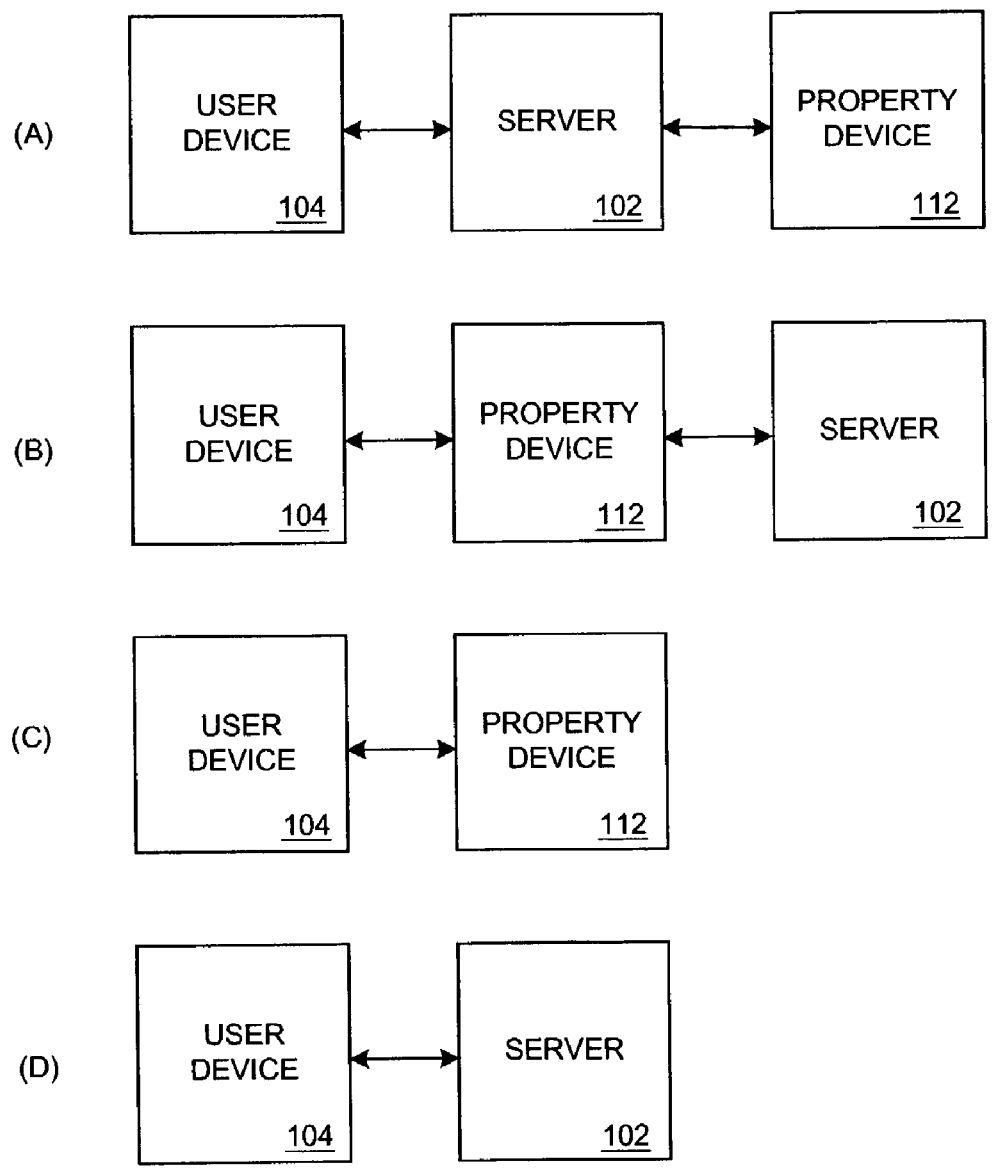
FIG. 2 is a diagram showing potential implementations of communications between a user device, a property device and a server.

Now referring to FIG. 2, four potential scenarios are shown that illustrate some of the many embodiments of the present invention. As shown in scenario (A), the user device 104 communicates directly or indirectly with the server 102 that, in turn, communicates directly or indirectly with the property device 112. Communications between the user device 104 and the server 102 and between the server 102 and the property device 112 may occur directly, via the communications network 118, or via some other communication channel. The server 102 also may be in communication with other property devices. The server 102 may receive a request from a user via the user device 104 to evaluate the user's affinity for a property. In some embodiments the server 102 may conduct or implement one or more methods to evaluate the user's affinity and provide a notification to the user and/or property owner accordingly. In other embodiments, the server 102 may pass some or all of the user's request to the property device 112 and receive instructions or information regarding how to proceed from the property device 112.

In scenario (B), the user device 104 communicates directly or indirectly with the property device 112 that, in turn, communicates directly or indirectly with the server 102. Communications between the user device 104 and the property device 112 and between the property device 112 and the server 102 may directly, occur via the communications network 118, or via some other communication channel. The property device 112 may receive a request from a user via the user device 104 to evaluate the user's affinity for a property. In some embodiments the property device 112 may conduct or implement one or more methods to evaluate the user's affinity and provide a notification or certification to the user accordingly. In other embodiments, the property device 112 may receive the results of a test or questionnaire taken by the user and/or other information provided by the user to the server 102. The server 102 may score the tests or otherwise evaluate the results to determine if the user should be awarded a certification designation. The server 102 may then provide the certification to the user and/or provide a notification to the property device 112 so that the property device can coordinate sending of the certification to the user.

In scenario (C), the user device 104 communicates directly or indirectly (which may be via the communication network 118) with the property device 112. As in scenario (B), the property device 112 may receive a request to evaluate a user's affinity for a property. The property device 112 may coordinate all of the functions necessary to evaluate the user's affinity and/or provide a benefit to the user accordingly.

In scenario (D), the user device 104 communicates directly or indirectly (which may be via the communication network 118) with the server 102. The scenario (D) is similar to the scenario (C) discussed above with the server 102 performing the functions instead of the property device 112.

Process Description

Figure 3:
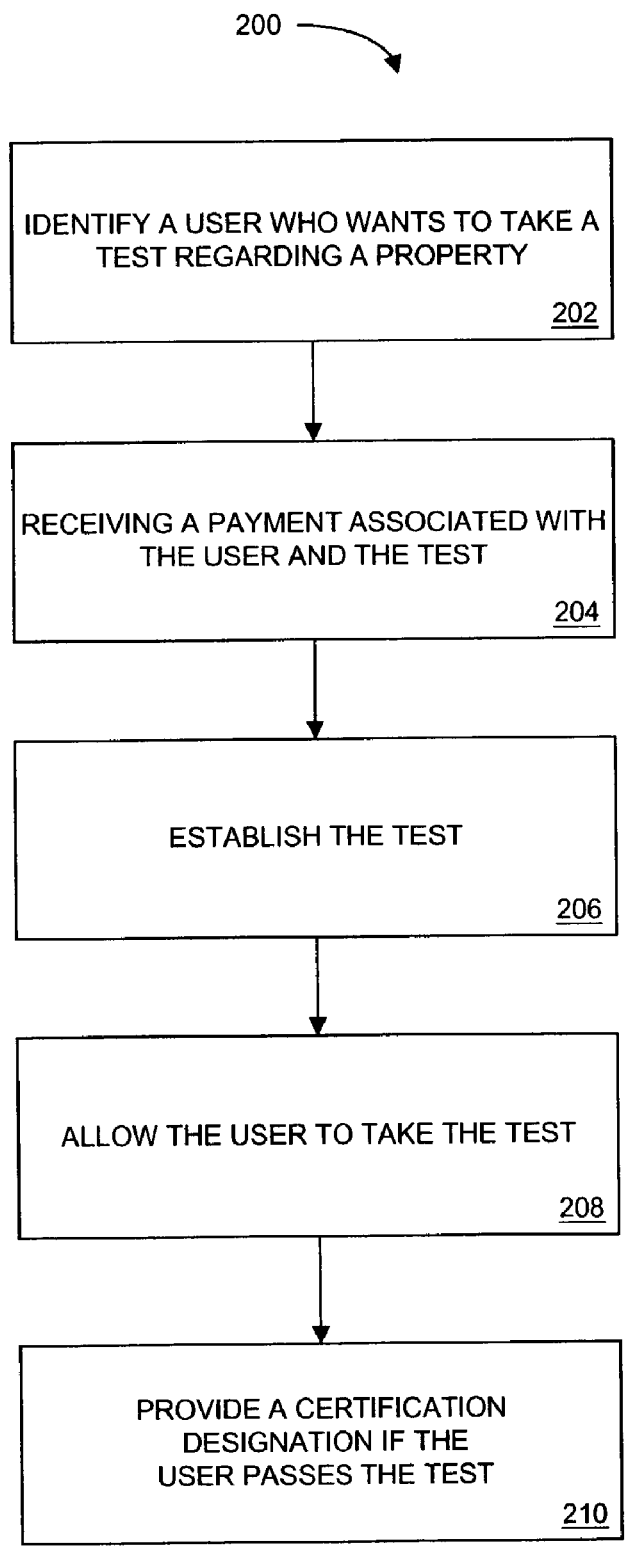
FIG. 3 is a flowchart of a first embodiment of a method in accordance with the present invention.
Figure 4:
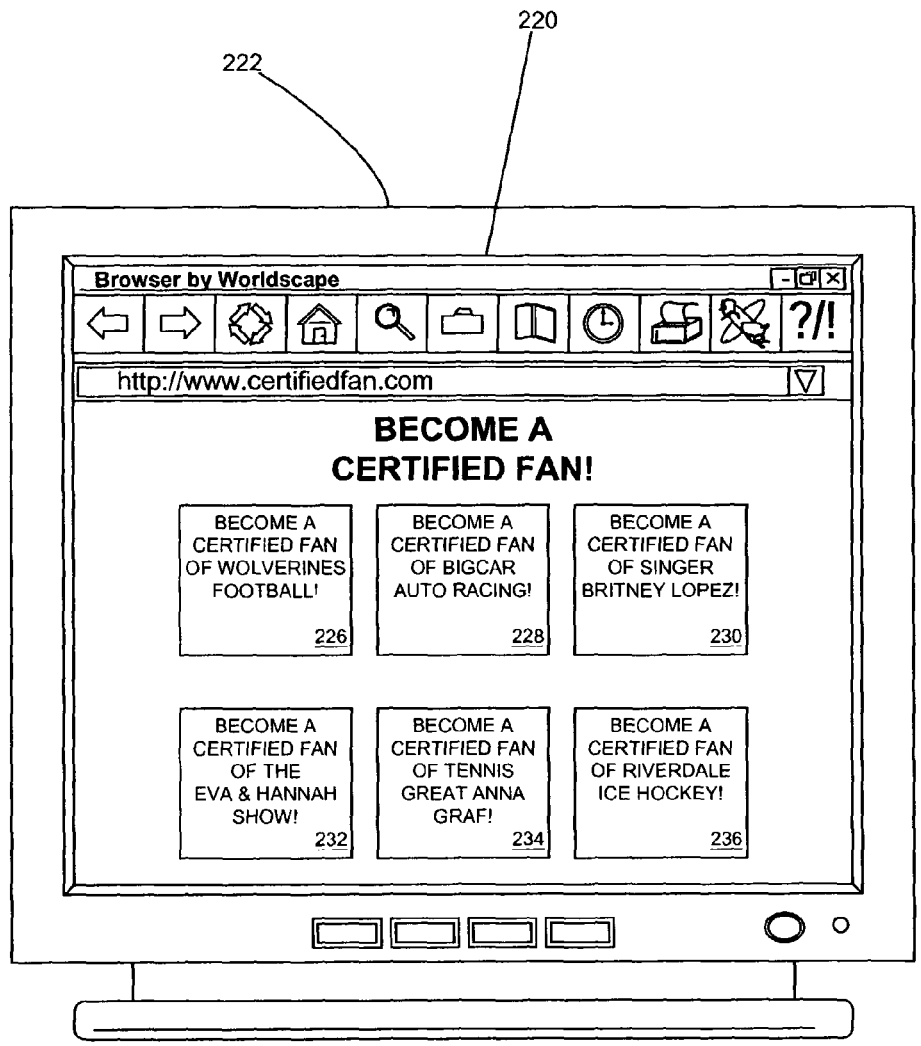
FIG. 4 provides an illustration of a representative Web page that may be used in accordance with the methods of the present invention to allow a user to select a property.

Reference is now made to FIG. 3, where a flow chart 200 is shown which represents the operation of a first embodiment of the present invention. The particular arrangement of elements in the flow chart 200 is not meant to imply a fixed order to the steps; embodiments of the present invention can be practiced in any order that is practicable. In some embodiments, some or all of the steps of the method 100 may be performed or completed by the server 102, a property device, and/or another device (e.g., a kiosk located in a mall or merchant). For purposes of explanation, but not limitation, the server 102 is assumed to implement the method 200. In some embodiments, some or all of the method 200 may be implemented by the server 102 configured as described above in scenarios (A) and (D) in FIG. 2.

Processing begins at a step 202 during which the server 102 identifies a user who wants to take a test regarding a property as a way of demonstrating the user's affinity for the property. There are many ways in which the step 202 may be implemented or conducted. For example, in some embodiments the server 102 may implement a Web site or other online resource that users can access via user devices. The user may access the Web site, login or register at the Web site, or otherwise identify himself or herself to the Web site. As another example, the server 102 may include or have access to a voice response unit or speech recognition unit that allows a user to provide information via a telephone or keypad. Thus, the step 202 may be completed by the server 102 receiving information from the user that identifies the user. Such user information may include the user's name, an identifier associated with the user, etc. During a registration process with the Web site, the user may provide other attribute information such as the user's age, residence, mailing address, marital status, gender, email address, telephone number, income, employer, etc. In some embodiments, attribute information regarding a user may be action or activity based. For example, user information may include information regarding whether the user is a season ticket holder for games of a specific team, the number of years the user has followed or be interest in the team, the user's attendance history for the games, whether or not the user has completed or initiated one or more designated activities (e.g., whether the user has attended one or more promotional events sponsored by the team), etc.

In some embodiments, information regarding one or more users may be stored in or accessed from a user information database. As another example, in some embodiments, a cookie may be stored on a user device being used to access the server 102 or a Web site or other resource implemented by the server 102, the cookie being associated with a specific user. When the user accesses the Web site or server 102 again, the server 102 may retrieve the stored cookie as a means of identifying the user. The server 102 may then query or prompt the user to confirm his or her identity. As a third example, in some embodiments a user may be directed to a Web site or other resource implemented by the server 102 from another Web site or resource. More specifically, the user may select a link on a Web site that directs the user to the Web site implemented by the server 102. As part of being directed to the Web site implemented by the server 102, another device or Web site may pass, forward or otherwise transmit information identifying the user to the server 102.

In some embodiments, the server 102 may allow or enable a user to take a test regarding a single property. Thus, the server 102 already knows the property of interest to the user. In other embodiments, the server may allow or enable to take a test regarding one of multiple properties. In such embodiments, the server 102 may prompt or query the user to provide information or a selection of which property is of interest to the user. Alternatively, information received by the server 102 may allow the user to determine which property is of interest to the user. For example, a user may be visiting or browsing through a first Web site focused on a specific entertainer (e.g., a property). If the user indicates an interest in taking a test regarding the entertainer, the first Web site may direct or link the user to a Web site hosted, used, associated with, or implemented by the server 102. In addition, the first Web site may transmit information to the server 102 that identifies the user and/or the specific entertainer of interest.

In some embodiments, the method 200 may include the server 102 providing information to a user regarding a test, the payment required to take a test, certification designations or levels available for one or more properties, etc. In addition, in some embodiments, the method 200 may include the server 102 providing a tutorial on a property to a user prior to the user taking a test regarding the property. The tutorial may be provided at no charge to the user or may require an additional or separate payment.

In some embodiments, the step 202 or some other part of the method 200 may include identifying or otherwise determining the property of interest to the user. For example, the server 102 may query or prompt the user to provide information or to make a selection regarding a property of interest to the user. In other embodiments, the server 102 may be associated with only one property so that the property of interest to the user is implied or assumed by the user accessing the server 102.

During a step 204, the server 102 may receive a payment associated with the user and the test. For example, the server 102 may prompt or query the user to provide credit card information for use in charging the user to take the test. As another example, the server 102 may receive an indication from a bank, online financial service, or other entity that the user has made a payment allowing the user to take the test. Thus, in some embodiments, the step 204 may be completed by the server 102 receiving a notification that the user has made a payment sufficient to allow the user to take a test regarding a property. In some embodiments, different fees may be charged for different tests, different properties, different certification designations, etc. In addition, in some embodiments the step 204 may be optional or not used.

In some embodiments, the payment may be received or requested after a user has requested or taken a test regarding a property. A payment may be a monetary amount or a non-monetary amount. For example, in some embodiments a user may have to pay twenty dollars to take a test associated with a property. Alternatively, in some embodiments a user may have to provide demographic or contact information as payment for being allowed to take a test or receive a certification designation for passing a test. As another example, in some embodiments a user may have to complete or perform a designated action (e.g., visit a designated retailer, go to a designated location, purchase a ticket for a specific event) as payment for being allowed to take a test.

In some embodiments, receiving a payment associated with a test may be or include receiving a payment after a user has passed a test that entitles the user to receive or be awarded a certification designation. Thus, the payment for the test may, in reality, be a payment for the certification designation.

In some embodiments, different amounts or types of payment may entitle a user to receive different certification designations. The amount or type of payment made by a user may determine in whole or in part what test the user can take or what certification designation the user can earn from taking the test.

During a step 206, the server 102 creates or otherwise establishes a test for the user. The test may be in any one or more of a variety of formats. For example, the test may include twenty true/false questions regarding the property and/or twenty multiple-choice questions regarding the property. In some embodiments, establishing a test for a property may include establishing a test regarding a subject associated with the property. For example, a property may have an associated subject of "numismatics" and an associated certifying entity called "The American Coin Collectors Club". Establishing a test for the property may include creating a test on coin collecting or other numismatic related issue. The test may be customized for the particular user identified during the step 202.

In some embodiments, a test may be generated each time a user takes a test, thereby allowing different users to take different tests. In addition, a user who takes multiple tests regarding a property may take different tests each time. One way in which different tests may be created is to select questions for a test from a larger pool of questions. For example, a pool of four hundred questions may be created or available regarding a property. Each test may include twenty of the questions selected randomly from the group of four hundred questions. New questions may be added to the pool and existing questions removed from the pool to further facilitate variations in different tests over time.

In some embodiments, a test may be created for a particular user only after the user has made or authorized a payment that entitles the user to take the test. In these embodiments, the test may reflect or allow the most recent updates to questions or new questions to be used and may reduce opportunities for a user to obtain a test prematurely since the test is created just before it is provided to the user and, as a result, is not available in advance.

In some embodiments, tests may vary or be customized according to one or more attributes of a user. For example, suppose two users want to take a test regarding a specific football team. If the first user is twenty-five years old, the first user might not be asked questions relating to events involving the football team that occurred prior to the user's fifteenth birthday. If the second user is sixty-five years old, the second user might not be asked questions relating to the football team that occurred prior to the user's fifteenth birthday. However, as the second user is thirty years older than the first user, the second user might be asked questions on a test that might not asked on a test given to the first user. As another example, suppose the two users live in different geographic areas. The first user may live in the same metropolitan area as the football team while the second user may live in another city, state, country, etc. Presumably the first user may have access to information regarding the football team more easily than the second user as a result of local and in-depth newspaper and television coverage of the football team while the second user may be able to obtain different, or more limited, information. Thus, the second user may be asked different questions to reflect the second user's more limited access to local information regarding the football team in comparison to the first user. As a third example, a user who is a season ticket holder for a team or organization may be asked different questions than a user who has only attended one game. Thus, different tests may reflect different affinity levels for the team or organization as a result of the levels of affinity already demonstrated by the users. The user who has season tickets already demonstrates affinity for the team or organization from the purchase of tickets and may receive an easier test. A user who does not have season tickets or who does not attend games regularly may have to pass a more difficult test in order to demonstrate greater affinity for the team or organization or may have to participate in other team related activities in order to receive the easier test.

In some embodiments, a question may have an associated difficulty rating. For example, a difficulty rating for a question may be "easy", "medium" or "hard" or be quantified on a scale of one to ten with a rating one reflecting the most difficult question. Ratings may be established in advance by educated estimate or guess. Over time, the number of correct versus incorrect answers for a question also might be used as an indication of the question's difficulty. For example, a question answered correctly twelve out of twenty times might have a rating of six (e.g., (12/20)×10). A question answered correctly twelve out of forty times might have a difficulty rating of three (e.g., (12/40)×10). The lower the score, the more difficult the question since a fewer percentage of users are answering the question correctly on tests. A difficulty rating of one to three might be considered "difficult", a difficulty rating of four to seven might be considered "medium" and a difficulty rating of eight to ten might be considered "easy". As questions are answered correctly or incorrectly over time, their associated difficulty ratings may change.

When creating or otherwise establishing a test during the step 206, the server 102 may select different questions having different difficulty ratings. For example, if a test is supposed to have ten questions, the server 102 may select three questions rated as "easy", three questions rated as "difficult", and four questions rated as "medium" to help maintain consistency among test such that that different users receive the same level of difficulty for different tests taken by the users.

In some embodiments, particularly when a multiple-choice format is used with a test, establishing a test may include establishing or otherwise determining one or more incorrect answers for one or more questions on the test and establishing or otherwise determining the correct answers for one or more questions on the test. In addition, the order of questions and listed answers for each question may be done randomly or in accordance with a designated procedure or formula.

In some embodiments, different tests may have different questions or may have some or all of the same questions in different orders. As a result, different tests may have different overall difficulty ratings. Thus, the method 200 may include determining or establishing a passing grade or other score associated with a specific test or certification designation. For example, a test comprising ten questions, all of which are rated "medium" or "difficult" may have a lower passing score than a test having ten questions, some of which are rated "easy" and a minority of which are rated "difficult". Alternately, different questions having different difficulty ratings may have different point values associated with them that are used to create a final score. For example, a question rated "easy" may be worth ten points, a question rated "medium" may be worth twenty points, and a question rated "hard" may be worth thirty points. A user taking a test have three easy questions, four medium questions, and three hard questions may need to score at least 140 points in order to pass the test or earn a certification designation associated with the score of 140 points In some embodiments, the server 102 or another device or entity may determine what constitutes "passing" of a test. Thus, what is considered "passing" for a test may vary, even between tests that include some or all of the same questions. In other embodiments, "passing" of a test may be equated with earning of a certification designation. Different scores on the test may be associated with different certification designations. Thus, "passing" of a test may be equated to earning a certification designation if a score on the test is high to earn or justify award of the certification designation.

In some embodiments, information regarding questions for a test and/or incorrect and correct answers to the questions may be stored in a question information database for use or access by the server 102 or another device. Also, in some embodiments, information regarding one or more tests may be stored in a test information database for use or access by the server 102 or another device.

During a step 208, the server 102 facilitates or otherwise allows the user to take the test created during the step 206. In some embodiments, the server 102 might enable the user to take the test online. In other embodiments, the server 102 might send some or all of the test to the user as part of an email message, instant message communication, file transfer, facsimile transmission, etc. As another example, the server 102 may allow or enable a user to take a test via a telephone. The user may indicate answers to questions on the test by speaking into the telephone or by selecting buttons on a keypad.

In some embodiments, a test may have one or more parameters associated with it. For example, a maximum amount of time may be associated with a test and/or one or more questions for the test. Different questions and different tests may have different times associated with them. For example, a test of ten questions may have a shorter allotted time period than a test of twenty questions. As another example, a question rated as "easy" may have a shorter time allotted to it than a question rated "medium" or "hard". As a third example, a multiple-choice question may have a larger time allotted to it than a true/false question. In some embodiments, a user may have an unlimited amount of time to answer a question or take a test or may have an option of having the test conducted in a timed or untimed manner. A score may be adjusted by the time used to take a test. For example, a user who answers eight of ten questions correctly on a test in one minute may receive a higher score on the test that a person who answers the same eight of ten questions correctly but takes two minutes to answer the questions.

In embodiments where the server 102 provides or displays the test to a user online, the server 102 may include a timer or clock that shows the time remaining to complete a question, the time remaining to complete a test, etc. In embodiments where the server 102 sends the test to a user, the user may have to return the answers or provide a reply that includes one or more of the answers within a given time frame. The server 102 may provide all of the questions on a test to the user at the same time or approximately the same time. Alternatively, the server 102 may provide questions on the test one at a time or in other small groups of questions. In some embodiments, the test might not be timed or the test taker may have an option of having the test timed.

During a step 210, the server 102 may provide a certification designation if the user passes the test or otherwise demonstrates affinity for the property. The server 102 may provide the designation directly or indirectly to the user. Alternatively, the step 210 may be completed by the server 102 providing a notification or other communication to another device (e.g., a property device) or entity (e.g., a property) that a certification designation can or should be provided or awarded to the user or that the user has otherwise earned the certification designation. In some embodiments, the method 200 may include scoring or grading the test and/or determining if the user has passed or failed the test. The certification designation may be provided or awarded to the user immediately after the user passes the test or at a later time (e.g., at a ceremony honoring one or more users who have demonstrated affinity for the property).

In some embodiments, the server 102 may provide an indication of the results of a test to another device such as, for example, a device associated with a specific property. The server 102 might not score the test results beforehand. Rather, the server 102 might receive an indication regarding whether or not a user has passed based on the test results. That is the other device may score the test based on information received from the user and pass or send information to the server 102 regarding whether or not the user has passed or failed the test. In this type of embodiment, the device scoring the test or otherwise determining whether or not the user has passed the test can change what is considered a passing score over time or change how the test is scored irrespective of the operation of the server 102. After a user has taken a test, passed a test, and/or otherwise demonstrated affinity for a property, the user may be assigned, allowed to select, or otherwise be associated with a certification number or other certification identifier.

As previously discussed above, a certification designation for a property may indicate that the user has passed the test or completed some other action that has entitled the user to the certification designation, that the user is a "certified fan" of the property, or provide some other sort of recognition of the user's interest in and knowledge of the property (e.g., affinity for the property). In some embodiments, the certification designation may include a name or other identifier of the user, photograph of the user, a quote or message, autograph (which may be in digital or other electronic form), etc. provided by the user, etc. that may be submitted or otherwise provided by the user or retrieved from a database that contains such items. In some embodiments, the certification designation may include an indication of the user's score on a test, an indication of one or more actions the user completed to earn the certification designation, an indication of the amount of time the user took to take the test or complete another action, the year of the certification designation, test, or action, a time period of validity associated with the certification designation, the name or other identifier of a property or certifying entity associated with the property; etc.

In some embodiments, the server 102 may provide the certification designation in electronic format. For example, the server 102 may send a PDF file, computer image or animation, a background or frame for a computer window displayed on a monitor, or other electronic version of a certificate, plaque, award, etc. The electronic version may include a name or other identifier associated with the property and/or a photo, message, quote, user information, certification number or identifier, etc. provided by or associated with the user. Alternatively, or in addition, the server 102 may provide a notification to another entity or device (e.g., a property device) that the user has passed a test associated with a specific property or a specific certification designation. The notification may include contact information (e.g., address, email address) or other information regarding the user, a message selected or provided by the user, etc.

In some embodiments, different certification designations may have or be associated with different tests or require different scores to obtain. For example, in order to obtain a certification designation of "Gold Level Certified Fan" for a property, a user may have to answer ninety percent of questions correctly on a test that examines the user's knowledge of the property or score above a first designated score on the test. Thus, the first designated score is associated with the "Gold Level Certified Fan" certification designation. However, in order to obtain a certification designation of "Silver Level Certified Fan" for a property, a user may have to answer eighty percent of questions correctly on the test or score at or above a second designated score on the test (which may be lower than the first designated score needed for the "Gold Level Certified Fan"). Thus, the second designated score is associated with the "Silver Level Certified Fan" certification designation. As another example, one property may require that a user answer ninety percent of the questions correctly on a test to obtain the certification designation of "certified fan" of the property while a different property might require only that the user answer only eighty percent of the questions correctly.

In some embodiments, the server 102 also may send a notification directly or indirectly to the user or another entity or device if the user does not pass the test. For example, if a user does not pass a test for a certification designation associated with a specific property, the server 102 may provide one or more of the following to the user: results of the test, an offer to allow the user to take the test again, an offer to allow the user to take a different test, an offer to allow the user to take or receive a tutorial directed towards helping the user pass a new test, an indication of the questions the user got wrong and the correct answers for the questions, etc.

In some embodiments, a user may receive, select or designate some or all of an identifier to be associated with the user. For example, if the user registers with the server 102, the user may receive, select, or be associated with a unique registration identifier. Registration of the user may occur before the user takes a test, after the user takes the test, or after the user passes the test or completes some other designated action. The registration identifier may be included on a certificate designation provided to the user and/or used to track communications to and from the user and comprise all or part of a certification identifier associated with the user. The user selected or indicated portion of the identifier may act as a sort of vanity identifier for the user and may be unique to the user. In some embodiments, the server 102 or another device or entity may assign some or all of an identifier to the user when the user makes a payment, when the user takes a test or when a user passes a test, when the user otherwise demonstrates affinity for a property, etc.

In some embodiments, a certification designation may be valid only for a limited or finite period of time. Thus, the certification designation may have an associated time period of validity or usability. After the time has expired, the user may need to take and pass a new test in order to maintain the certification designation. For example a certification designation may be valid for only one year. Any document or other materials provided to the user may indicate when the user took a test, passed a test, earned a certification designation, completed a designated activity, a unique registration identifier, certification identifier or other identifier associated with the user, and/or for how long the certification designation is valid. The certification designation also may include the name or other identifier of the property, a related certifying entity, etc.

Once the user has passed a test associated with a specific property and/or obtained or earned a certification designation associated with the property, the user may be allowed to purchase or otherwise order and obtain additional goods and materials (e.g., caps, license plates, bumper stickers) that indicate the user's status as "certified fan" of the property or other certification designation awarded to the user, the date the user passed the test or obtained a certification designation, a unique registration identifier, certification identifier or other identifier associated with the user, etc. In addition, the user's status may enable the user to receive special offers, discounts, or other benefits not generally available to others.

In some embodiments, the user may be able to inform or otherwise notify one or more other people regarding the user's passing of a test. For example, once a user has passed a test, or as part of a user registration process, the user may be allowed or prompted to provide email addresses, pager numbers, facsimile numbers, telephone numbers, names, etc. for one or more other people that the user wishes to brag to or otherwise inform regarding the user's passing of the test, the user receiving or being awarded a certificate or certification designation, etc. In addition, the user may also be allowed or prompted to provide a message to be used in communications to the designated people or a default message may be offered or used. The server 102 or another device may then provide or send a copy of the certification, message, or other communication to the designated people using the contact information provided by the user.

In some embodiments, the step 210 may not be used. Instead of sending or otherwise providing a certification designation, the server 102 or another device may send or otherwise provide an indication that the user has passed the test or otherwise earned the certification designation. The certification designation may then be provided at a later time.

With reference to FIGS. 4-10, a more detailed example of one potential implementation of the method 200 will now be provided. Now referring to FIG. 4, the server 102 or a property device may provide or implement a Web page 220 that can be displayed on a computer monitor 222 (which may be part of a user device). The Web page 220 may be part of a larger Web site directed to allowing users to take tests to obtain certification designations regarding one or more properties. By selecting one of the buttons 226, 228, 230, 232, 234, 236, a user can indicate in which property the user is interested. For example, a user may want to take a test to become a "certified fan" of a football team known as the "Wolverines". Thus, the user may select or click on the button 226.

Figure 5:
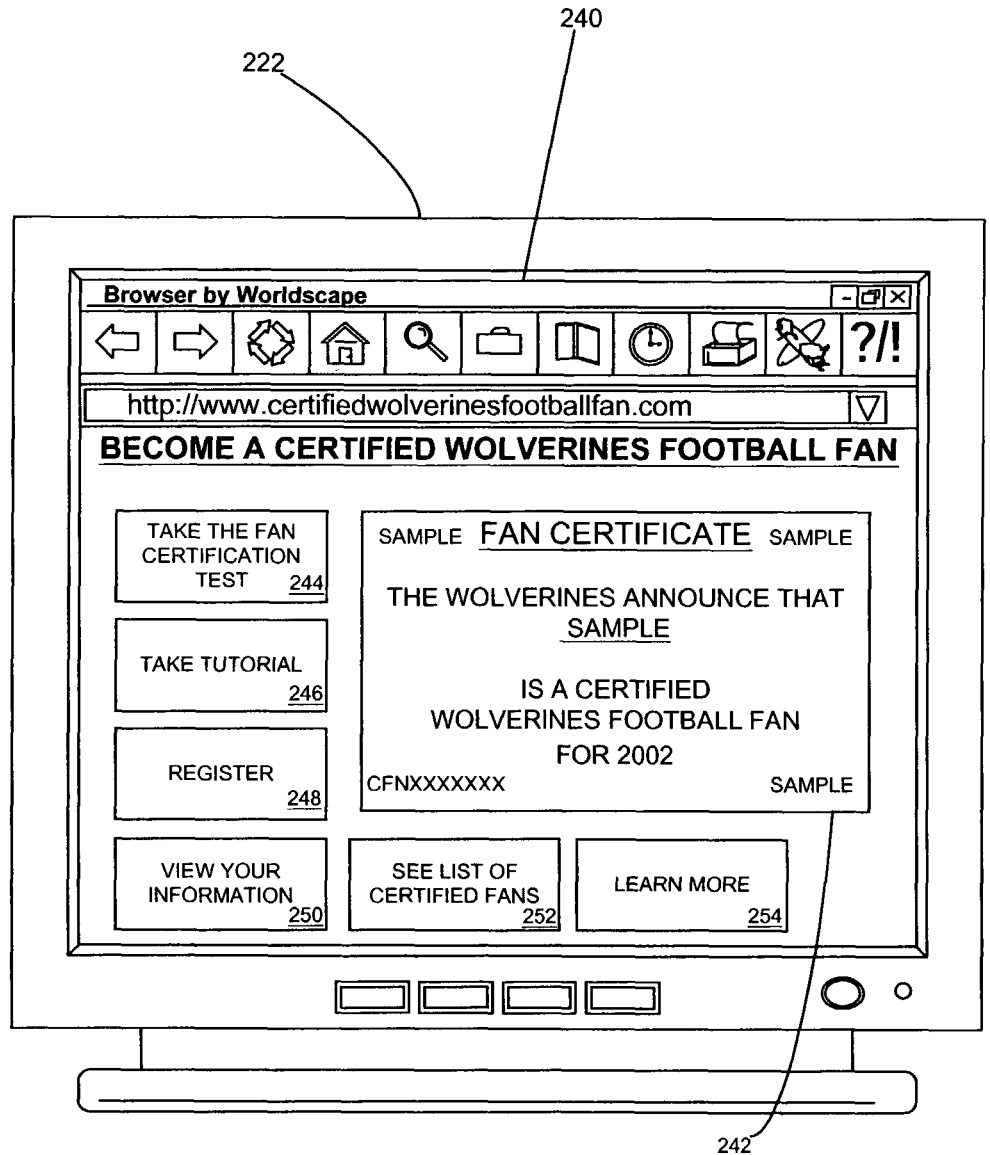
FIG. 5 provides an illustration of a representative Web page that may be used in accordance with the methods of the present invention to allow a user to indicate a desire to take a test.

Now referring to FIG. 5, once the user has selected the button 226 on the Web page 220, the user may be directed to Web page 240 that allows the user to take a test regarding the "Wolverines" football team and to obtain a certification designation as a "Certified Wolverines Football Fan" as indicated in certificate 242. The Web page 240 also may include or have many different functions or capabilities. For example, if the user selects button 244, the user may be directed to taking a test regarding the "Wolverines" football team. If the user selects button 246, the user may be allowed to view or receive a tutorial on the "Wolverines" football team as a way of preparing for a test. The user may have to pay to receive or view the tutorial. A different payment may be required if a user has already taken a test prior to receiving the tutorial as opposed to if the user is taking the tutorial prior to taking a first test regarding a property.

If the user selects button 248, the user may be prompted or queried to register with the Web site. During registration, the user may provide an address, name, financial account or other information. In addition, the user may be assigned or allowed to select or enter an identifier that will be associated with the user. In some embodiments, registration of a user may occur when the user takes or completes a test.

Figure 6:
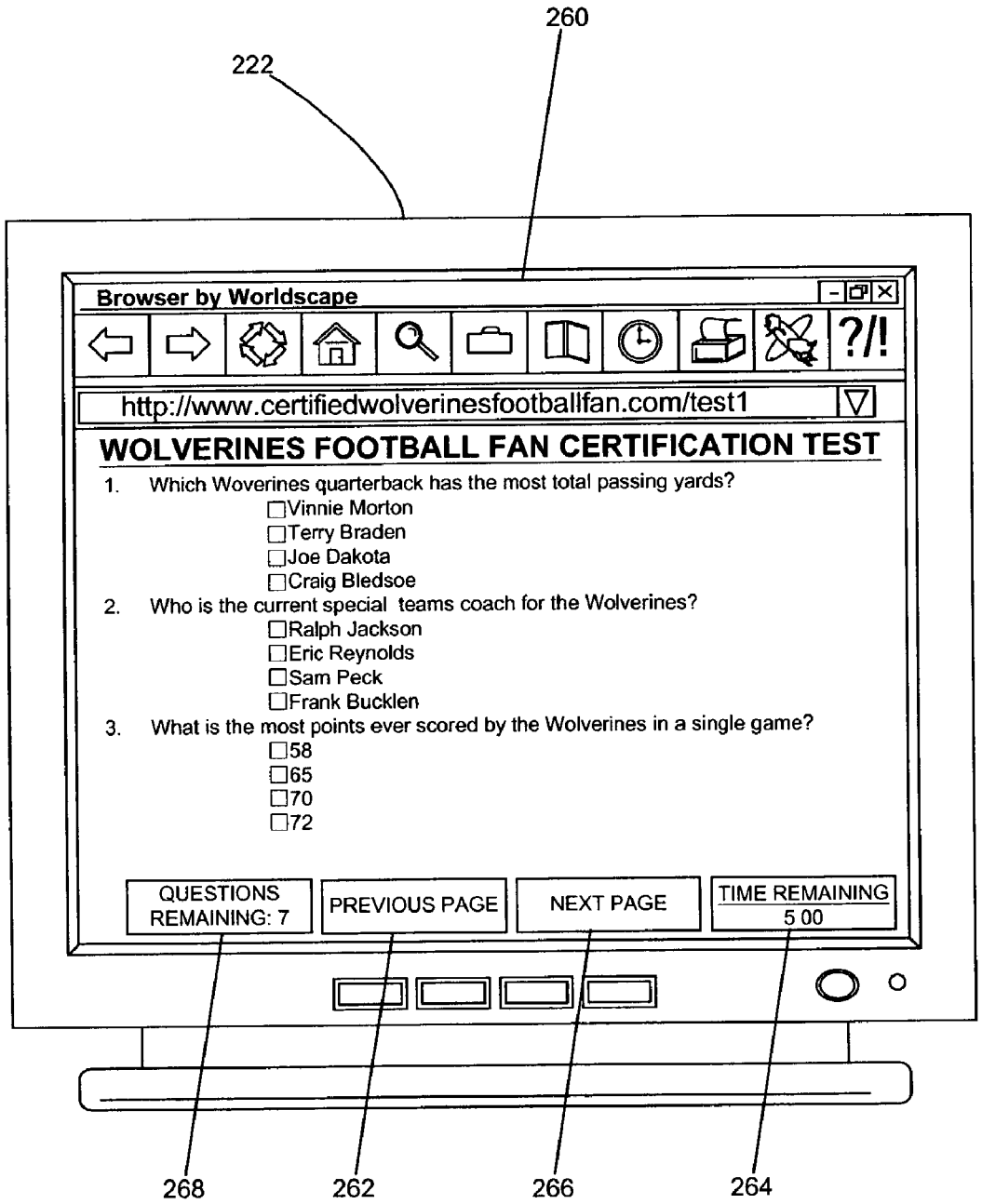
FIGS. 6 and 7 provide an illustration of a representative Web page that may be used in accordance with the methods of the present invention to provide a test to a user.
Figure 7:
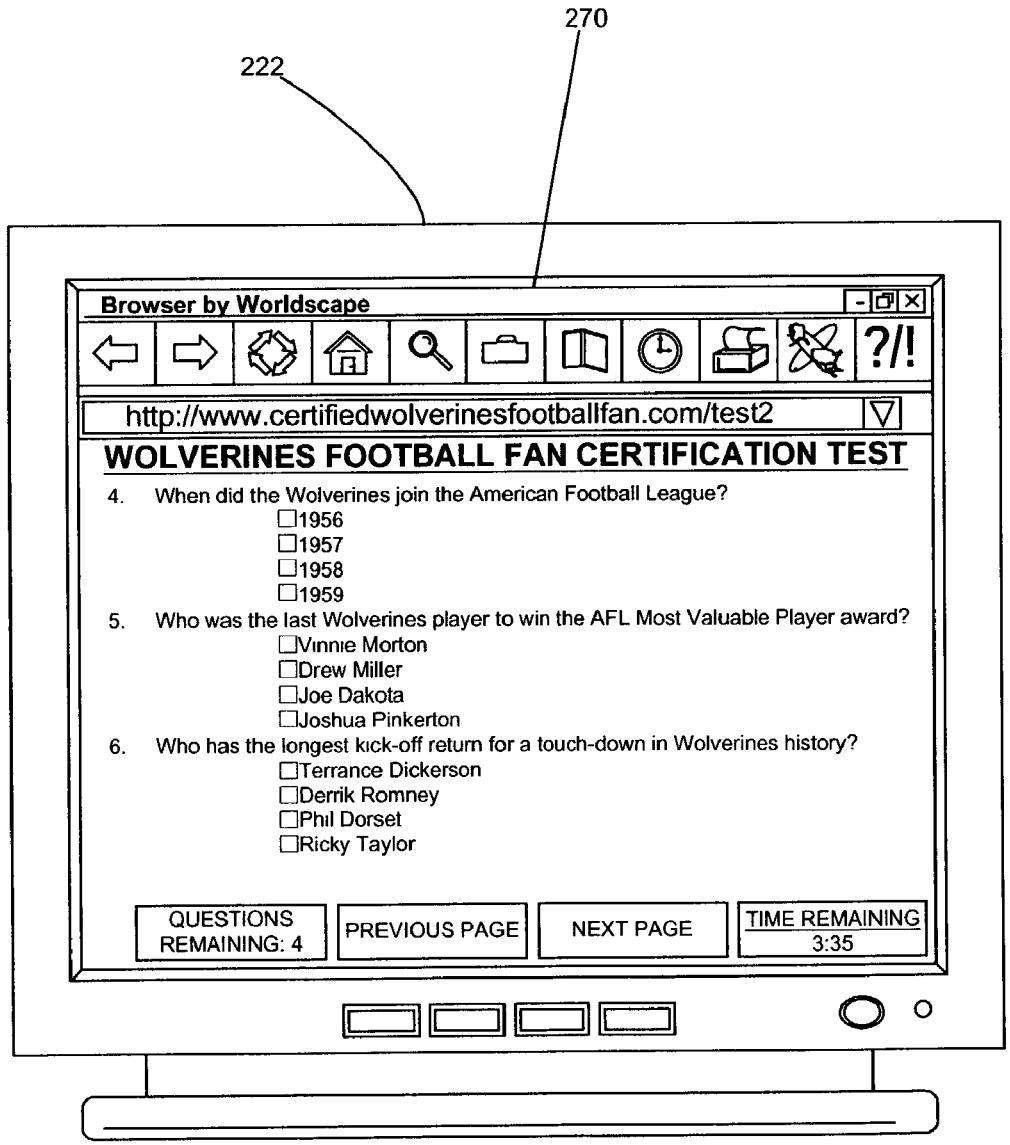

If the user selects button 250, the user may be allowed to view or update information previously provided by the user (e.g., during a previous registration process). If the user selects button 252, the user may be directed to another Web page where the user may be allowed to see a list or roster of other users who have obtained the certification designation of "Certified Fan". If the user selects button 254, the user may be directed to another Web page that provides information about the fan certification process for the "Wolverines" football team, test and/or payment options for obtaining a certification designation, benefits of obtaining a certification designation, etc. If the user selects the button 244, the user may be directed to a Web page 260 that provides a test to the user regarding the "Wolverines" football team, as illustrated in FIG. 6. The Web page 260 includes the first three multiple-choice questions for the test along with four potential answers for each question. The user can indicate a selection of an answer for a question by checking a check box associated with the answer. The Web page 260 also includes a "PREVIOUS PAGE" button 262 that the user may select to return to the Web page 240 and a timer indicator 264 that shows the time remaining for the user to take the test. If desired, the timer indicator 264 may show elapsed time in addition to or instead of the time remaining. In addition, the Web page 260 includes a "NEXT PAGE" button 266 that the user can select to move to the next Web page 270 of the test, as illustrated in FIG. 7 as well as a number of questions remaining indicator 268 that indicates the number of questions remaining for the test. The process may continue until the user completes the test, runs out of time (if applicable) or reaches the last page of the test.

In some tests, questions may require knowledge of local information regarding the Wolverines or other locations, buildings, stories, etc. related to the Wolverines. For example, a question may ask "What is displayed on the grass in both end zones of Wolverine Stadium?" with the possible choices of "Picture of a Wolverine", "The name 'Wolverine'", "An American Flag", and "A Series of Blue and Gold Footballs".

Figure 8:
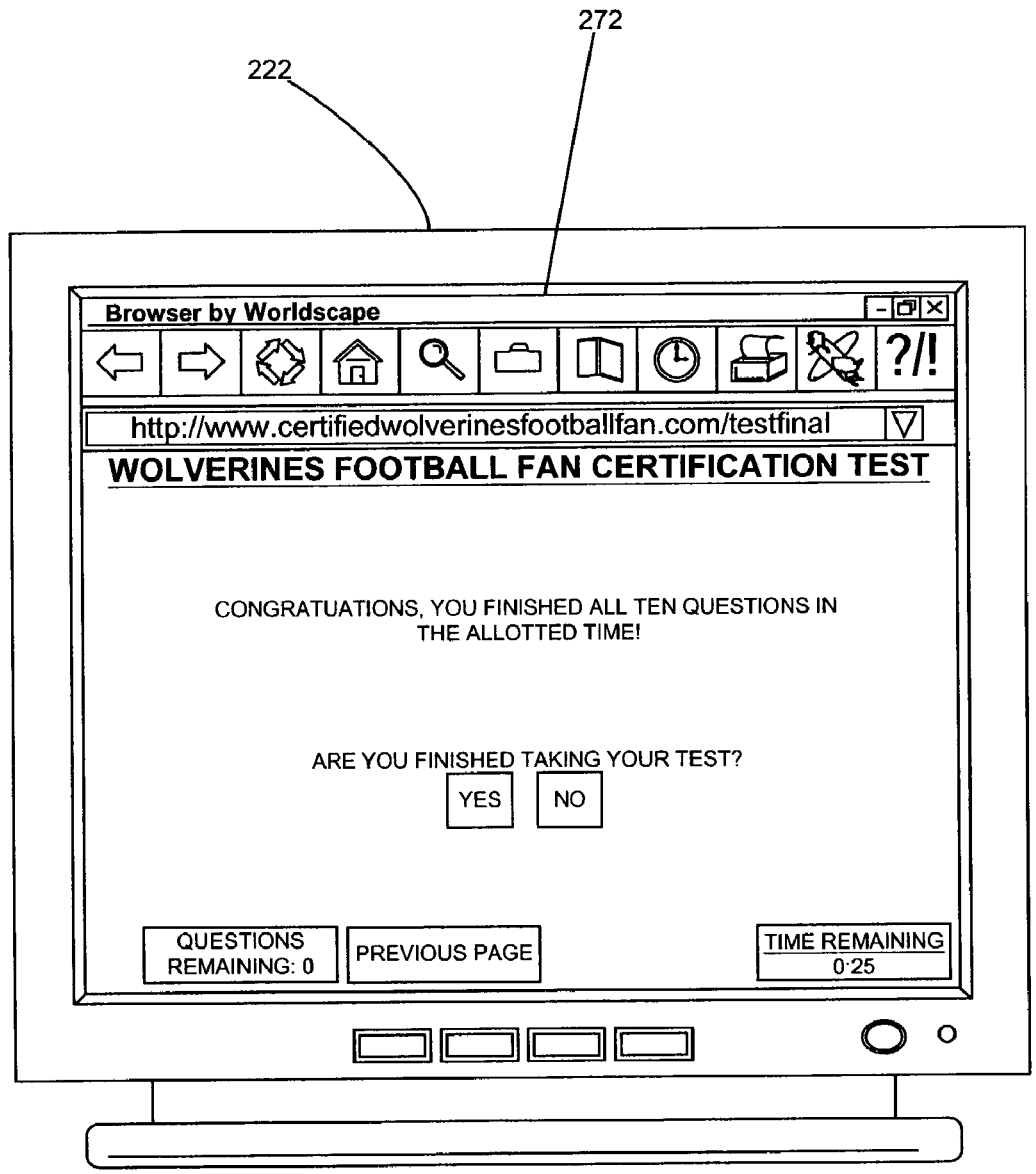
FIG. 8 provides an illustration of a representative Web page that may used be in accordance with the methods of the present invention to determine if a user is finished taking a test.

Now referring to FIG. 8, once the user has completed the test the user may be directed to a Web page 270 that displays the time remaining in a timer or clock window 274 and queries the user to determine if the user is done taking the test. The user may select button 276 to return to the previous Web page. Once the user has indicated that he or she is done with the test, or the time allotted to the user to take the test has elapsed, the server 102 or another device implementing this example may direct the user to a Web page 280 (see FIG. 9) if the user has passed the test or otherwise earned the right to a certification designation, or a Web page 282 (see FIG. 10) if the user has failed the test or not otherwise earned the right to a certification designation.

Figure 9:
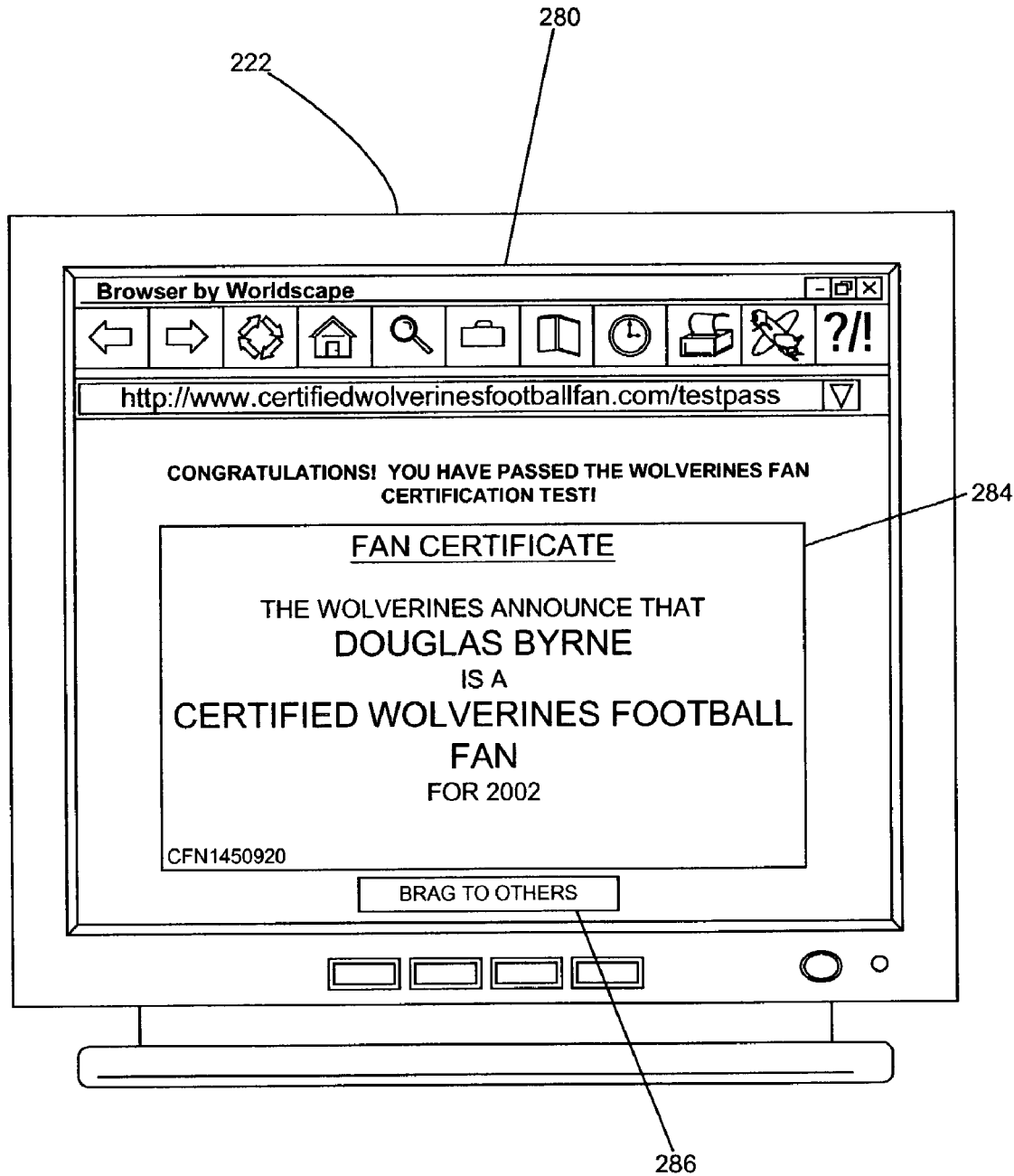
FIG. 9 provides an illustration of a representative Web page that may be used in accordance with the methods of the present invention to inform a user that the user has passed a test.

Now referring to FIG. 9, the Web page 280 indicates that the user (in this example Douglas Byrne) has passed the fan certification test for the "Wolverines" football team. In addition, the Web page 280 displays a copy of certification 284 that includes a certification designation (i.e., "Certified Wolverines Football Fan") and a certification number (i.e., "CFN 1450920") associated with the user. A copy of the certification 280 may be sent electronically to the user (e.g., as PDF file, as part of an email or instant message communication, via facsimile). In addition, the user may be allowed or offered the opportunity to purchase or obtain other goods that include the certification designation and/or the certification number. For example, a tangible copy of the certificate 284 may be mailed or otherwise provided to the user.

The Web page 280 also includes a "BRAG TO OTHERS" button 286, selection of which may allow the user to provide email addresses, pager numbers, facsimile numbers, telephone numbers, names, etc. for one or more other people that the user wishes to brag to or otherwise inform regarding the certificate 284, the user's passing of the test, etc. The user also may be able to provide or enter a message to be sent to the designated people after the user selects the "BRAG TO OTHERS" button 286

Figure 10:
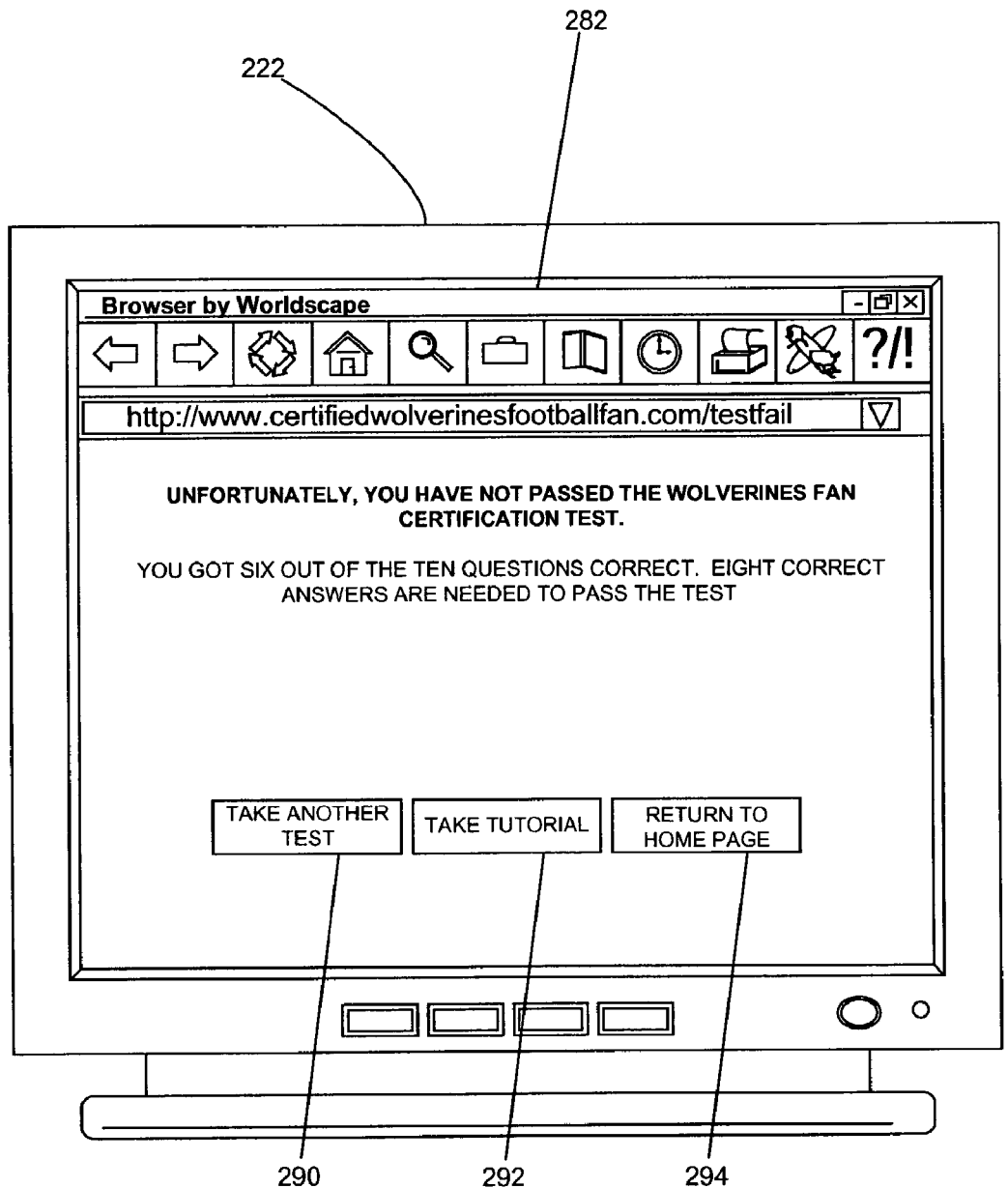
FIG. 10 provides an illustration of a representative Web page that may be used in accordance with the methods of the present invention to inform a user that the user has failed a test.

Now referring to FIG. 10, the Web page 282 provides an indication to the user that the user has not passed the fan certification test. The user may be provided information regarding the results of the test and the results needed to pass the test. By selecting the appropriate button 290, 292, 294, the user may try to take another test, take or otherwise receive the tutorial associated with the test material or property, or return to the home Web page 240 (see FIG. 5).

Figure 11:
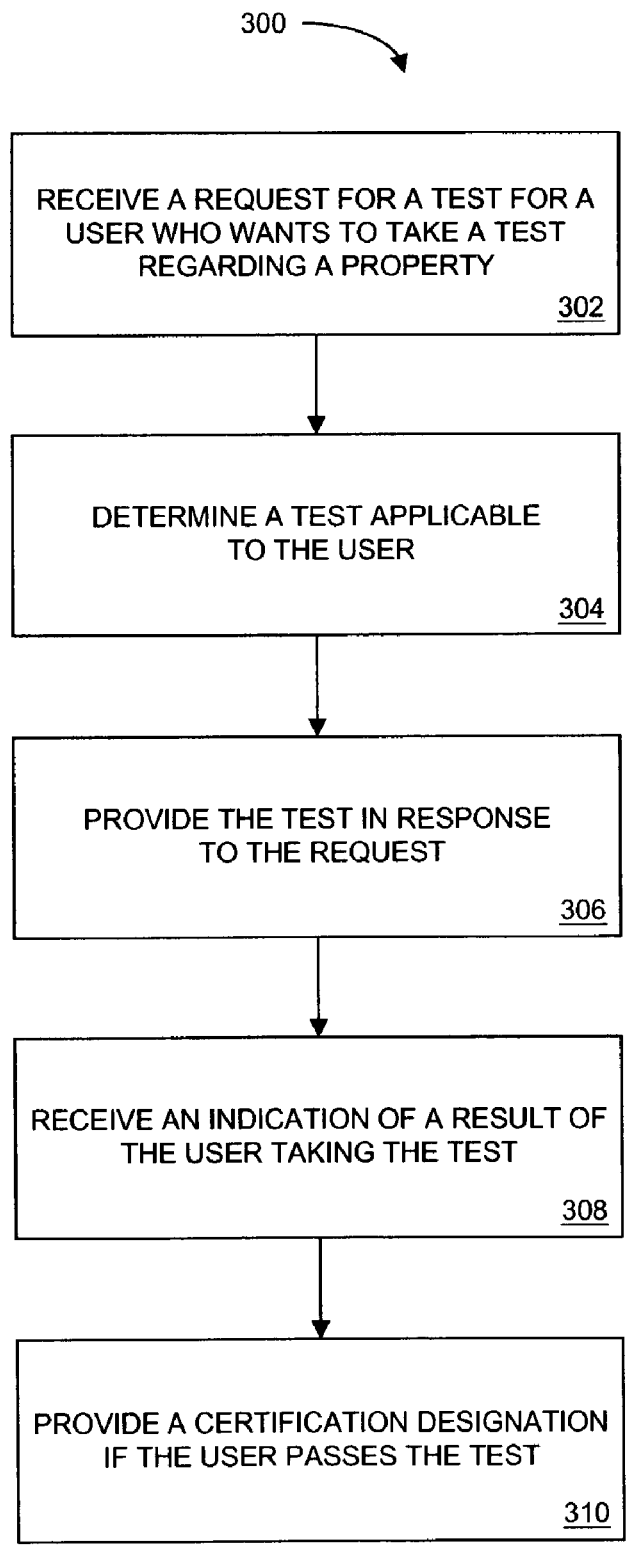
FIG. 11 is a flowchart of a second embodiment of a method in accordance with the present invention.

Reference is now made to FIG. 11, where a flow chart 300 is shown which represents the operation of a second embodiment of the present invention. The particular arrangement of elements in the flow chart 300 is not meant to imply a fixed order to the steps; embodiments of the present invention can be practiced in any order that is practicable. In some embodiments, some or all of the steps of the method 300 may be performed or completed by the server 102 or a property device. For purposes of explanation, but not limitation, the property device 112 is assumed to implement the method 300. In some embodiments, the method 300 may include some or all of the variations discussed above in relation to the method 200, and vice versa. In some embodiments, some or all of the method 300 may be implemented by the property device 112 configured as described above in scenarios (B) and (C) in FIG. 2.

The method 300 is particularly well suited for embodiments wherein the property device 112 or another device interacts directly with a user (such as via a Web site, kiosk, or other electronic or online resource) and requests a test from the property device 112 to provide to the user. The property device 112 may store questions regarding the applicable property that may change or be updated over time. Thus, the property device 112 can provide a current test upon receipt of a request from the server 102 or a user.

Processing begins at a step 302 during which a request is received for a test for a user who wants to take a test regarding a property. In some embodiments, the request might be received directly from the user. In other embodiments, the property device 112 may receive the request from the server 102. The server 102 may implement a Web site or other resource or communicated with another device (e.g., a kiosk located at a baseball stadium or at a concert hall) at which the user can request to take a test, learn about the property, provide user information, receive electronic versions of certificates, etc. The request may identify the user, the property, a certification level the user desires, etc. In some embodiments, the request also might indicate that the user has made a payment sufficient to allow the user to take a test regarding the property or include information (e.g., credit card information, bank account information) that allows a charge or payment from the user to be processed.

During a step 304, the property device 112 determines or otherwise establishes a test. The step 304 is similar to the step 206 previously discussed above and may include some or all of the variations discussed with respect to the step 206. The test may be customized for the particular user or otherwise reflect or be based on one or more attributes of the user.

During a step 306, the property device 112 provides the test. In some embodiments, the property device 112 may provide the test via a Web site, in an email or other communication sent to a user, in an email or other communication sent to the server 102 (which may then send it or display to the user, send it to a user device or other device, etc.), or otherwise allow the user to access the test.

During a step 308, the property device 112 receives an indication of the results of the test taken by the user. For example, the property device 112 may receive an indication of the results of the test from the server 102 if the server 102 is coordinating activity by or with the user and/or facilitating the taking of a test by the user. The results may indicate simply that the user has passed or failed the test in accordance with a previously defined test scoring algorithm or procedure. Alternatively, the results may indicate only the user's answers to the questions on the test so that the property device 112 can grade or score the test based on the user's answers.

During a step 310, the property device 112 may provide a certification designation to the user if the user passes the test or otherwise demonstrates affinity for the property. As previously discussed above, a certification designation for a property may indicate that the user has passed the test, that the user is a "certified fan" of the property, that the user has earned a certification designation, or provide some other sort of recognition or designation of the user's interest in and knowledge of the property and/or affinity for the property.

The step 310 is similar to the step 210 previously discussed above and may include some or all of the variations discussed with respect to the step 210. Similarly, in some embodiments the step 210 previously discussed above may include some or all of the variations discussed herein with regard to the step 310.

The property device 112 may provide the certification designation directly to the user. Alternatively, the property device 112 may provide the certification designation to the server 102 or to another device that may then provide it to the user.

In some embodiments of the method 300, once a user has passed a test, a tangible copy of a certification designation may be mailed or otherwise sent to the user. In addition, the user's name or other identification may be stored or published in or added to a list, book, publicly available document, Web page, record, etc. of users who have passed a test associated with the same property, scored within the same range on tests associated with a property, earned a certification designation, completed one or more actions that demonstrate affinity, etc. In some embodiments, the user may be even offered an opportunity to provide an image or photograph, autograph, message, quotation, etc. to place or publish in the list, book, document, Web page, record, etc.

In some embodiments, the step 310 may not be used. Instead of sending or otherwise providing a certification designation, the property device 112 or another device may send or otherwise provide an indication that the user has passed the test or otherwise earned the certification designation. The certification designation may then be provided at a later time.

Figure 12:
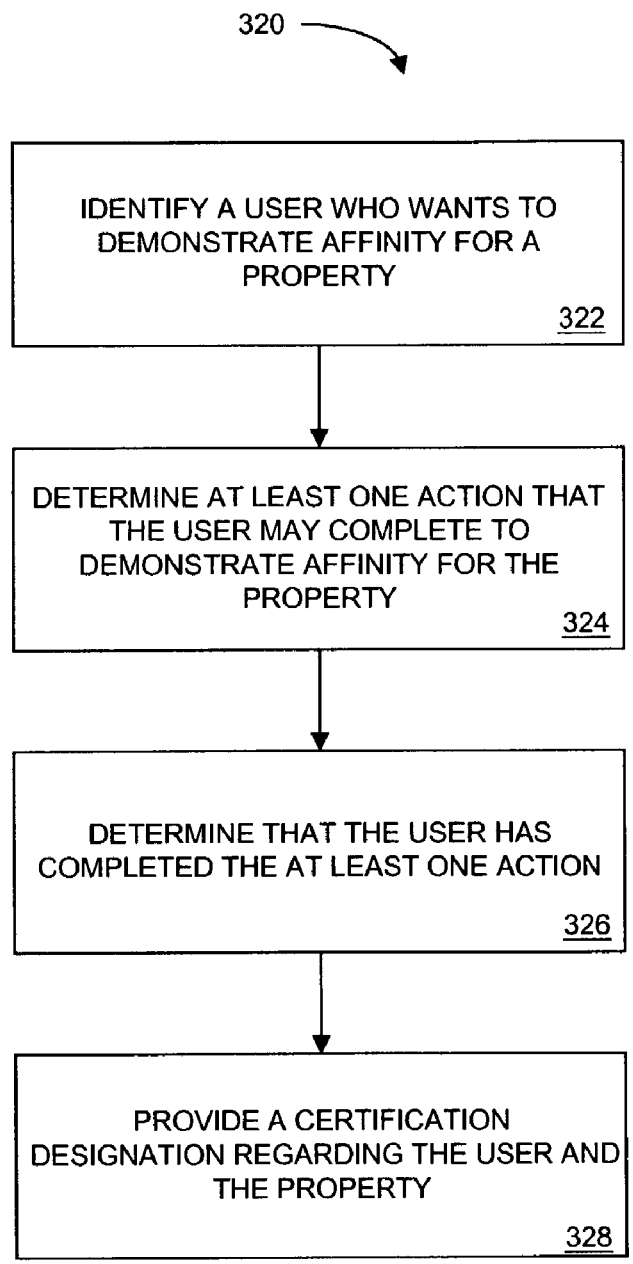
FIG. 12 is a flowchart of a third embodiment of a method in accordance with the present invention.

Reference is now made to FIG. 12, where a flow chart 320 is shown which represents the operation of a third embodiment of the present invention. The particular arrangement of elements in the flow chart 320 is not meant to imply a fixed order to the steps; embodiments of the present invention can be practiced in any order that is practicable. In some embodiments, some or all of the steps of the method 320 may be performed or completed by the server 102 or a property device. In some embodiments, the method 320 may include some or all of the variations discussed above in relation to the methods 200 and 300. In some embodiments, some or all of the method 320 may be implemented by the property device 112 configured as described above in scenarios (A) and (D) in FIG. 2 or the server 102 as described above in scenarios (C) and (D). For purposes of explanation, but not limitation, the property device 112 is assumed to implement the method 320.

Processing begins at a step 322 during which a user is identified that wants to demonstrate affinity for a property. The step 322 is similar to the step 202 previously discussed above. There are many ways in which the step 302 may be implemented or conducted. For example, in some embodiments the property device 112 may implement a Web site or other online resource that users can access via user devices. The user may access the Web site, login or register at the Web site, or otherwise identify himself or herself to the Web site. Thus, the step 302 may be completed by the property device 112 receiving information from the user that identifies the user. Such user information may include the user's name, an identifier associated with the user, a photograph of the user, etc.

During a registration process with the Web site, the user may provide other attribute information such as the user's age, residence, mailing address, marital status, gender, email address, telephone number, activities undertaken by the user (e.g., attendance at property related events, purchase of tickets) or activity related attributes of the user (e.g., the user is a season ticket holder), etc. In some embodiments, information regarding one or more users may be stored in or accessed from a user information database. As another example, in some embodiments, a cookie may be stored on a user device being used to access the property device 112 or a Web site or other resource implemented or used by the property device 112, the cookie being associated with a specific user. When the user accesses the Web site or the property device 112 again, the property device 112 may retrieve the stored cookie as a means of identifying the user. The property device 112 may then query or prompt the user to confirm his or her identity. As a third example, in some embodiments a user may be directed to a Web site or other resource implemented by the property device 112 from another Web site, resource, or device (e.g., the server 102). More specifically, the user may select a link on a Web site that directs the user to the Web site implemented by the property device 112. As part of being directed to the Web site implemented by the property device 112, another device or Web site may pass, forward or otherwise transmit information identifying the user to the property device 112.

In some embodiments, the step 322 or some other part of the method 320 may include identifying or otherwise determining the property of interest to the user. For example, the property device 112 may query or prompt the user to provide information or to make a selection regarding a property of interest to the user. In other embodiments, the property device 112 may be associated with only one property so that the property of interest to a user is implied by the user accessing the property device 112.

During a step 324, the property device 112 may determine at least one action that the user may complete to demonstrate the user's affinity for the property. For example, if the property is a soccer team, the user may demonstrate affinity by attending one or more of the team's games, purchasing tickets for one or more of the team's games, listening to radio programs or watching television broadcasts regarding the team or the team's games, acquiring autographs from one or more team members, attending events sponsored by the team or that include team members or representatives, purchases and wearing apparel or other items that demonstrate affinity, etc. As another example, one action that the user may complete may include taking a test to demonstrate the user's knowledge of the soccer team, as previously discussed above. The action may be based on an attribute of the user. For example, a user living in the same town as a college football team (e.g., the property) may be able to complete actions related to games or other team related events more easily than a user living far away from the college. In some embodiments, the action determined during the step 324 may be an action that the user has already completed (e.g., purchased tickets to an upcoming game or event, read a designated book, purchased a designated product within past thirty days).

In some embodiments, a user may need to take a test and complete another action to demonstrate the user's affinity for a property. In some embodiments, information regarding one or more potential actions that may be determined during the step 324 may be stored in or accessed from an action information database.

In some embodiments, the method 320 may include providing a notification or other indication directly or indirectly to the user regarding the at least one action determined during the step 324. In addition, in some embodiments the property device 112 may receive a payment or indication of a payment associated with the user in a manner similar to the step 204 previously discussed above.

During a step 326, the property device 112 may determine that the user has completed the at least one action determined during the step 324. For example, the property device 112 may prompt or query the user to provide information regarding an action the user may have completed. For example, the user may have previously purchased one or more tickets to one or more of the soccer games and may provide proof or an indication of such to the property device 112 as part of the step 326. Alternatively, the property device may provide an indication of the at least one action determined during the step 324 and the user may send a communication (e.g., email message) to the property device 112 once the user has completed the action. The property device 112 may provide the indication of the at least one action by displaying on a Web page, sending the user a communication (e.g., email message, instant message, facsimile) that includes information regarding the at least one action, etc.

In some embodiments, determining that a user has completed an action may include or be satisfied by the user agreeing to complete the action in the future. For example, the property device 112 may inform a user that the user can demonstrate affinity for a book by attending a book signing event sponsored by a local area bookstore or by the book publisher. If the user sends back a confirmation, promise, or other indication that the user will attend the book signing event, the user may be considered as having completed the designated action. Alternatively, the merchant or party holding or hosting the book signing event may provide an indication that the user attended the event, purchased a book at the event or related book store, etc. that may act as a confirmation of the user's attendance.

In some embodiments, the property device 112 may receive information directly or indirectly from a user that the user has completed one or more actions determined during the step 324. Alternatively, in some embodiments, the property device 112 may receive an indication from another source that a user has completed an action determined during the step 324 for a property. For example, the user may need to attend a promotional event regarding the property. The host or sponsor of the event may send information to the property device 112 regarding or confirming the user's attendance at the promotional event.

During a step 328, the property device 112 may provide a certification designation if the user has completed the at least one action determined during the step 324. The step 328 is similar to the step 210 and the step 310 previously discussed above.

In some embodiments, a user may acquire points or other indicators that demonstrate affinity for a property. For example, the user may acquire one or more points for answering one or more questions correctly on a test associated with the property. The user may or may not have to pass the test in order to acquire the points. Alternatively, or in addition, the user may acquire points or other indicators that demonstrate affinity for a property by completing one or more other actions as previously described above. Thus, in some embodiments, the user may not need to complete all of the actions determined during the step 324 in order to demonstrate sufficient affinity for a property to earn a certification designation. As a result, the step 326 may be alternatively implemented as determining that the user has sufficiently demonstrated affinity for a property by completing some or all of one or more of the at least one actions determined during the step 324. For example, the property device 112 may determine five different actions during the step 324 that the user may complete to demonstrate affinity for a property. The user may only need to complete three of the five actions, or at least part of each of the five actions, in order to earn the certification designation.

Server Configuration

Figure 13:
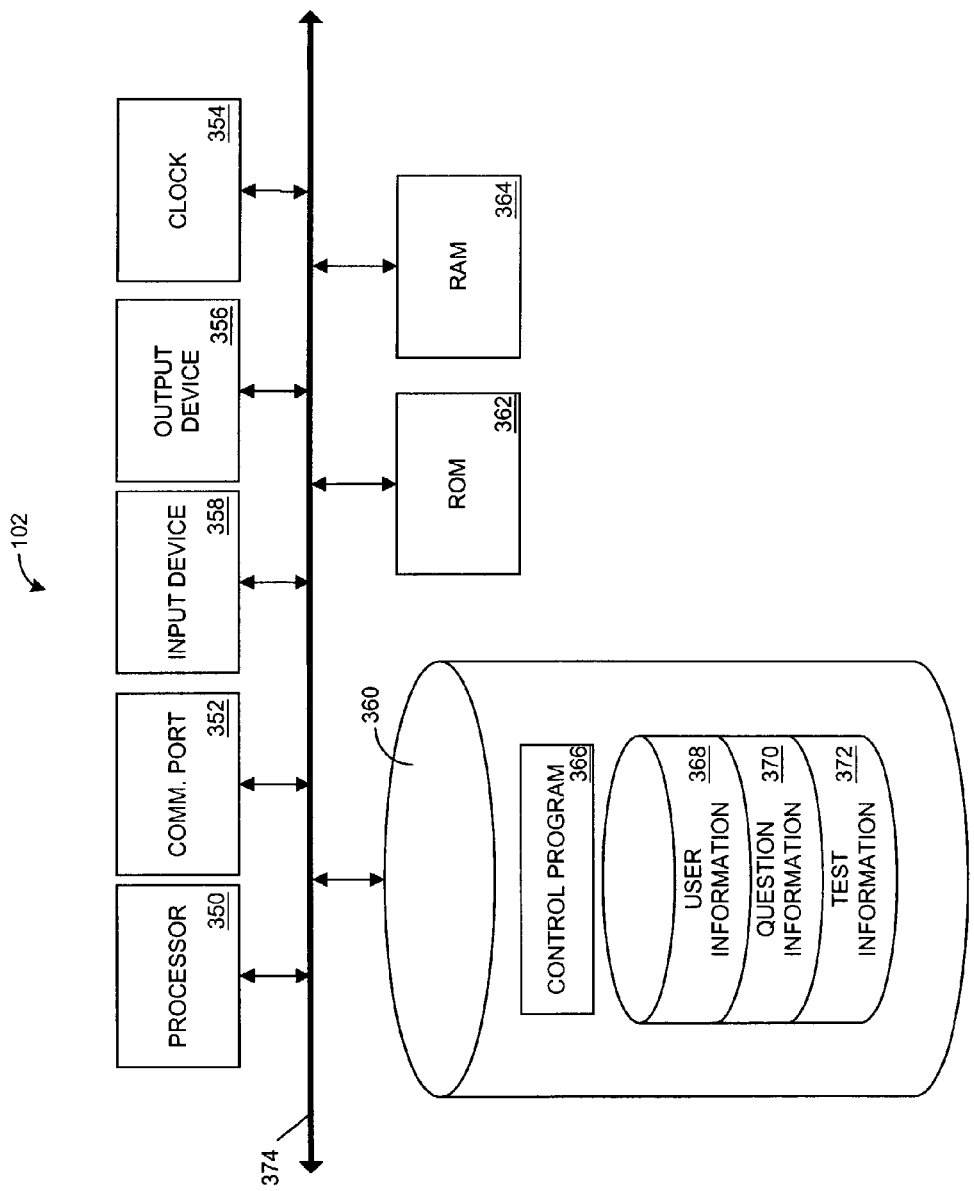
FIG. 13 is a block diagram of components for an embodiment of a server of FIG. 1.

Now referring to FIG. 13, a representative block diagram of a server or controller 102 is illustrated. The server 102 may include a processor, microchip, central processing unit, or computer 350 that is in communication with or otherwise uses or includes one or more communication ports 352 for communicating with user devices and/or other devices. Communication ports may include such things as local area network adapters, wireless communication devices, Bluetooth technology, etc. The server 102 also may include an internal clock element 354 to maintain an accurate time and date for the server 102, create time stamps for communications (e.g., a test, question, test result, certification designation, payment authorization or notification, request for a test, etc.) received or sent by the server 102, to maintain a timer indicator for a question and/or a test, etc.

If desired, the server 102 may include one or more output devices 356 such as a printer, infrared or other transmitter, antenna, audio speaker, display screen or monitor, text to speech converter, etc., as well as one or more input devices 358 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the server 102 may include a memory or data storage device 360 to store information, software, databases, communications, device drivers, tests, questions, etc. The memory or data storage device 360 preferably comprises an appropriate combination of magnetic, optical and/or semiconductor memory, and may include, for example, Random Read-Only Memory (ROM), Random Access Memory (RAM), a tape drive, flash memory, a floppy disk drive, a Zip™ disk drive, a compact disc and/or a hard disk. The server 102 also may include separate ROM 362 and RAM 364.

The processor 350 and the data storage device 360 in the server 102 each may be, for example: (i) located entirely within a single computer or other computing device; or (ii) connected to each other by a remote communication medium, such as a serial port cable, telephone line or radio frequency transceiver. In one embodiment, the server 102 may comprise one or more computers that are connected to a remote server computer for maintaining databases.

A conventional personal computer or workstation with sufficient memory and processing capability may be used as the server 102. In one embodiment, the server 102 operates as or includes a Web server for an Internet environment. The server 102 preferably is capable of high volume transaction processing, performing a significant number of mathematical calculations in processing communications and database searches. A Pentium™ microprocessor, such as the Pentium III™ or IV™ microprocessor, manufactured by Intel Corporation, may be used for the processor 350. Equivalent or other processors are available from Motorola, Inc., AMD, or Sun Microsystems, Inc. The processor 350 also may comprise one or more microprocessors, computers, computer systems, etc.

Software may be resident and operating or operational on the server 102. The software may be stored on the data storage device 360 and may include a control program 366 for operating the server, databases, etc. The control program 366 may control the processor 350. The processor 350 preferably performs instructions of the control program 366, and thereby operates in accordance with the present invention, and particularly in accordance with the methods described in detail herein. The control program 366 may be stored in a compressed, uncompiled and/or encrypted format. The control program 366 furthermore includes program elements that may be necessary, such as an operating system, a database management system and device drivers for allowing the processor 350 to interface with peripheral devices, databases, etc. Appropriate program elements are known to those skilled in the art, and need not be described in detail herein.

The server 102 also may include or store information regarding users, user devices, tests, properties, questions, actions, communications, etc. For example, information regarding one or more users may be stored in a user information database 368 for use by the server 102 or another device or entity. Information regarding one or more questions may be stored in a question information database 370 for use by the server 102 or another device or entity and information regarding tests may be stored in a test information database 372 for use by the server 102 or another device or entity. In some embodiments, information regarding one or more actions may be stored in an action information database for use by the server 102 or another device or entity. The actions may reflect ways in which a user may demonstrate affinity for a property. In some embodiments, some or all of one or more of the databases may be stored or mirrored remotely from the server 102.

According to an embodiment of the present invention, the instructions of the control program may be read into a main memory from another computer-readable medium, such as from the ROM 362 to the RAM 364. Execution of sequences of the instructions in the control program causes the processor 350 to perform the process steps described herein. In alternative embodiments, hard-wired circuitry may be used in place of, or in combination with, software instructions for implementation of some or all of the methods of the present invention. Thus, embodiments of the present invention are not limited to any specific combination of hardware and software.

The processor 350, communication port 352, clock 354, output device 356, input device 358, data storage device 360, ROM 362, and RAM 364 may communicate or be connected directly or indirectly in a variety of ways. For example, the processor 350, communication port 352, clock 354, output device 356, input device 358, data storage device 360, ROM 362, and RAM 364 may be connected via a bus 374.

While specific implementations and hardware configurations for the server 102 has been illustrated, it should be noted that other implementations and hardware/software configurations are possible and that no specific implementation or hardware/software configuration is needed. Thus, not all of the components illustrated in FIG. 13 may be needed for a server implementing the methods disclosed herein.

User Device

As previously discussed above, a user device may be or include any of a number of different types of devices, including, but not limited to a personal computer, portable computer, mobile or fixed user station, workstation, network terminal or server, telephone, beeper, kiosk, dumb terminal, personal digital assistant, facsimile machine, two-way pager, radio, cable set-top box, point-of-sale device, etc. In some embodiments, a user device may have the same structure or configuration as the server 102 illustrated in FIG. 13 and include some or all of the same components as the server 102.

Property Device

As previously discussed above, in some embodiments, a property device can comprise a single device or computer, a networked set or group of devices or computers, a workstation, etc. Also, in some embodiments, a property device may have the same structure or configuration as the server 102 illustrated in FIG. 13 and include some or all of the same components as the server 102.

Databases

As previously discussed above, in some embodiments a server, user device, or other device may include or access a test information database for storing or keeping information regarding one or more tests. One representative test information database 400 is illustrated in FIG. 14.

The test information database 400 may include a test identifier field 402 that may include codes or other identifiers for one or more tests, a question identifier field 404 that may include codes or other identifiers for one or more questions associated with the tests identified in the field 404, an answer field 406 that may include one or more indications of the answers given to the questions identified in the field 404 for the tests identified in the field 402, a user identifier field 408 that may include codes or other identifiers for users who took the tests identified in the field 402, a test date field 410 that may include information regarding when the users identified in the field 408 took the tests identified in the field 402, and a score field 412 that may indicate the scores for the tests identified in the field 402.

Other or different fields also may be used in the test information database 400. For example, in some embodiments a test information database may include information regarding the length of time it took a user to answer one or more questions for a test, the number of times a specific test has been given to one or more users, the number of times different incorrect answers have each been given to a question for a test, the order in which questions and/or possible answers for a test were displayed to a user taking the test, information regarding algorithms or weights used in scoring a test (e.g., different questions may be worth more than other questions), etc.

As illustrated by the test information database 400 of FIG. 14, the test identified as "T-1781" in the field 402 included ten questions, each of which were answered correctly by the user identified as "U-382694" on May 7, 2002. The designation "-C" after a question identified in the field 406 indicates that the question was answered correctly while a designation "-I" after a question identified in the field 406 indicates that the question was answered incorrectly. The user identified as "U-428023" in the field 408 took the test identified as "T-4231". The test "T-4231" included ten questions, six of which the user "U-428023" answered correctly. For example, the user chose the incorrect answer "JOE DAKOTA" to the question "Q-301-2".

As previously discussed above, in some embodiments a server, user device, or other device may include or access a user information database for storing or keeping information regarding one or more users. One representative user information database 452 is illustrated in FIG. 15.

The user information database 452 may include a user identifier field 452 that may include codes or other identifiers for one or more users, a user name field 454 that may include names or other descriptive information for the users identified in the field 452, a user address field 456 that may include address or other contact information (e.g., telephone number, email address) for the users identified in the field 452, a user age field that may include age information for the users identified in the field 452, a test date field 460 that may include information regarding when the users identified in the field 452 took tests, a test results field 462 that may include information regarding how the users performed on tests, and a certification number field 464 that may include certification or other designation information for users who passed a test.

Other or different fields also may be used in the user information database 450. For example, in some embodiments a user information database may include identifiers of tests taken by the users, other demographic information (e.g., gender, education level, marital status, family information) for users, information regarding whether or not a user has taken a tutorial for a test, information (e.g., email addresses, telephone numbers, facsimile numbers, names, addresses) for people that a user may wish to brag to or inform regarding taking or passing a test, information regarding payments made by users, information regarding financial accounts (e.g., bank accounts, savings accounts, credit card accounts) associated with users, etc.

As illustrated by the user information database 450 of FIG. 15, the user identified as "U-230910" in the field 452 is named "BILL JOHNSON" and has an address of "1212 MAIN STREET NEW CANAAN CONNECTICUT 55555". The user "U-230910" is twenty years old and has taken and failed two tests taken and passed a third test taken. The three tests taken by the user "U-230910" may be different tests. Upon passing the final test on Apr. 24, 2002, the user is assigned the certification or identification number "1451071".

As previously discussed above, in some embodiments a server, user device, or other device may include or access a question information database for storing or keeping information regarding one or more questions. One representative questions information database 500 is illustrated in FIG. 16.

The question information database 500 may include a question identifier field 502 that may include codes or other identifiers for one or more questions, a question description field 504 that may list, describe or include the actual questions associated with the identifiers listed in the field 502, an incorrect answer field 506 that may include information regarding potential incorrect answers that may be provided for the questions identified in the field 504, and a correct answer field 508 that may include the correct answers for the questions identified in the field 502. For purposes of brevity and ease of explanation, not all of the questions indicated in the test information database 400 of FIG. 14 are described in the question information database of FIG. 16.

As illustrated by the question information database 500 of FIG. 16, the question identified as "Q-301-1" is the question "WHICH WOLVERINES QUARTERBACK HAS THE MOST TOTAL PASSING YARDS?" which has a correct answer of "TERRY BRADEN". Three incorrect answers "VINNIE MORTON, JOE DAKOTA, CRAIG BLEDSOE" are provided for use when the question "Q-301-1" is posed as a multiple-choice question.

Other or different fields also may be used in the question information database 500. For example, in some embodiments, a question information database might include information regarding a difficulty rating associated with a question, information regarding a number of times a question has been used in one or more tests, information regarding the number of times a correct answer to a question is given to a question, information regarding a date a question was created or first used, information regarding a source of a question, information regarding the percentage of different groups of users (e.g., users grouped by age, zip code, gender, ticket holder status) that answered a question correctly or incorrectly, etc.

Now referring to FIG. 17, the question information database 500 may include several additional fields. For example, the question information database 500 may include a question difficulty rating field 524 that may include information regarding difficulty ratings associated with one or more questions, a number of times used field 526 that may include information regarding how many times a particular question has been used in tests, a number of times a correct answer given field 528 that may provide information regarding how many times a question used in one or more tests has been answered correctly, a number times question used by gender field 530 that may include information regarding how many a times a question has been used with a particular gender, and a time of times question answered correctly by gender field 532 that may include information regarding how many times a question has been answered correctly broken down by gender. As illustrated in FIG. 17, the question identified as "Q-301-1" is rated "HARD" and has been used in tests fifty-five times. Correct answers were given to the question "Q-301-1" thirty out of the fifty-five times the question "Q-301-1" was used in a test. In addition, of the fifty-five times the question "Q-301-1" was used in tests given to different users, forty times the question "Q-301-1" was used in tests given to males and fifteen times the question "Q-301-1" was used in tests given to females. The male test takers answered the question "Q-301-1" correctly twenty-five of the forty times while female test takers answered the question "Q-301-1" correctly five of the fifteen times.

In a manner similar to breakdown of questions used and answered by gender as shown in the fields 530 and 532, in some embodiments a question information database may include similar information broken down by age range, geographic location, zip code, season or other ticket holder status, and/or other criteria.

The methods of the present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, many, if not all, of the steps for the methods described above are optional or can be combined or performed in one or more alternative orders or sequences without departing from the scope of the present invention and the claims should not be construed as being limited to any particular order or sequence, unless specifically indicated.

Each of the methods described above can be performed on a single computer, computer system, microprocessor, etc. In addition, two or more of the steps in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although the present invention has been described with respect to various embodiments thereof, those skilled in the art will note that various substitutions may be made to those embodiments described herein without departing from the spirit and scope of the present invention.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

The embodiments of the invention in which an exclusive property or privilege is claimed are defined as follows:

1. A method, comprising:
   receiving, at a computer from a user who wants to demonstrate an affinity with a property, a request for a test to evaluate the user's knowledge of or devotion to the property;
   receiving, at the computer, a payment associated with the user, receipt of the payment allowing the user to take the test;
   determining, by the computer, a test that satisfies the user's request;
   customizing the test, by the computer, by basing a portion of the test at least in part on a demonstrated affinity for the property, an attribute of the user and by setting a difficulty level of the test based at least in part on the amount of the payment;
   providing the test to the user, by the computer, at least in part in response to the user's request;
   providing, to the user by the computer, in the instance the user passes the test, a certification designation identifying a level of affinity demonstrated by the user's taking and passing of the test; and
   providing the certification designation in electronic format for display to third parties.

2. The method of claim 1, wherein the payment includes at least one of demographic information associated with the user, contact information associated with the user, or an action performed by the user.

3. The method of claim 1, further comprising:
   determining, by the computer, if the user has passed the test.

4. The method of claim 1, wherein the test includes requiring the user to perform a task, and wherein the task includes at least one of attending an event, purchasing a ticket to an event, or purchasing merchandise associated with the property.

5. The method of claim 1, wherein the customized portion of the test includes at least one question.

6. The method of claim 1, wherein the certification designation provided to the user allows the user to receive an incentive.

7. The method of claim 6, wherein the incentive includes at least one of an opportunity to purchase a consumer good indicating the certification designation, a special offer, a promotion, and a discount.

8. The method of claim 6, wherein the incentive includes at least one of a reward, a benefit, and a recognition, that is customized by being based at least in part on an attribute of the user.

9. The method of claim 1, wherein the certification designation includes designating the user as a certified fan of the property.

10. The method of claim 1, wherein the certification designation is provided to the user in an electronic file.

11. The method of claim 1, further comprising:
receiving, at the computer, an indication that the user wishes to notify others in the instance the user passes the test.

12. The method of claim 11, wherein the indication includes a brag list comprising contact information for a plurality of individuals that the user wishes to send the notification to.

* * * * *